US009469207B2

(12) United States Patent
Keeling et al.

(10) Patent No.: US 9,469,207 B2
(45) Date of Patent: Oct. 18, 2016

(54) BASE MAGNETICS AND SEQUENCE DESIGN FOR DYNAMIC SYSTEMS

(71) Applicant: QUALCOMM Incorporated, San Diego, CA (US)

(72) Inventors: Nicholas Athol Keeling, Auckland (NZ); Mickel Bipin Budhia, Auckland (NZ); Chang-Yu Huang, Auckland (NZ); Michael Le Gallais Kissin, Auckland (NZ); Jonathan Beaver, Auckland (NZ)

(73) Assignee: QUALCOMM Incorporated, San Diego, CA (US)

( * ) Notice: Subject to any disclaimer, the term of this patent is extended or adjusted under 35 U.S.C. 154(b) by 95 days.

(21) Appl. No.: 14/308,018

(22) Filed: Jun. 18, 2014

(65) Prior Publication Data
US 2015/0298560 A1    Oct. 22, 2015

Related U.S. Application Data

(60) Provisional application No. 61/981,443, filed on Apr. 18, 2014.

(51) Int. Cl.
*B60L 11/18* (2006.01)
*B60L 5/00* (2006.01)
*B60M 7/00* (2006.01)

(52) U.S. Cl.
CPC .............. *B60L 11/182* (2013.01); *B60L 5/005* (2013.01); *B60M 7/003* (2013.01)

(58) Field of Classification Search
CPC .............. B60L 1/00; B60L 9/00; B60L 9/02; B60L 9/016
USPC ......................... 191/2–8, 22 R, 22 C; 701/22
See application file for complete search history.

(56) References Cited

U.S. PATENT DOCUMENTS

| 8,508,184 | B2 | 8/2013 | Sakakibara et al. |
| 2011/0184842 | A1* | 7/2011 | Melen ................ B60L 5/005 705/34 |
| 2012/0326522 | A1 | 12/2012 | Fukushima |
| 2013/0334891 | A1 | 12/2013 | Komma |

FOREIGN PATENT DOCUMENTS

| GB | 2496436 A | 5/2013 |
| WO | WO-2013091875 A2 | 6/2013 |
| WO | WO-2013122483 A1 | 8/2013 |

OTHER PUBLICATIONS

International Search Report and Written Opinion—PCT/US2015/023815—ISA/EPO—Jul. 8, 2015.

* cited by examiner

*Primary Examiner* — R. J. McCarry, Jr.
(74) *Attorney, Agent, or Firm* — Knobbe Martens Olson & Bear LLP

(57) ABSTRACT

Dynamic wireless charging systems may involve coordinating multiple charging base pads to provide coordinated, continuous power transfers to a moving receiver along the distance in which the dynamic wireless charging system is installed. The layout and design of the charging base pads, the current flow through the charging base pads, and the sequencing of charging base pad activation and current flow implemented may dramatically affect the power transfers and practicality of such dynamic systems. The sequencing and control of these coils may need to be capable of managing the individual coils with minimal infrastructure as well as be capable of distributing the required power from the power grid to these pads efficiently and safely, and may comprise charging base pads, controllers to control the power flow to, activation of, and current flow direction within the base pads.

42 Claims, 15 Drawing Sheets

BASE MAGNETICS AND SEQUENCE DESIGN FOR DYNAMIC SYSTEMS

CLAIM OF PRIORITY UNDER 35 U.S.C. §119

The present Application for Patent claims priority to Provisional Application No. 61/981,443 entitled "BASE MAGNETICS AND SEQUENCE DESIGN FOR DYNAMIC SYSTEMS" filed Apr. 18, 2014, and assigned to the assignee hereof. Provisional Application No. 61/981,443 is hereby expressly incorporated by reference herein.

TECHNICAL FIELD

This application is generally related to wireless power charging of chargeable devices such as electric vehicles.

BACKGROUND

Chargeable systems, such as vehicles, have been introduced that include locomotion power derived from electricity received from an energy storage device such as a battery. For example, hybrid electric vehicles include on-board chargers that use power from vehicle braking and traditional motors to charge the vehicles. Vehicles that are solely electric generally receive the electricity for charging the batteries from other sources. Battery electric vehicles are often proposed to be charged through some type of wired alternating current (AC) such as household or commercial AC supply sources. The wired charging connections require cables or other similar connectors that are physically connected to a power supply. Cables and similar connectors may sometimes be inconvenient or cumbersome and have other drawbacks. It is desirable to provide wireless charging systems that are capable of transferring power in free space (e.g., via a wireless field) to be used to charge the electric vehicle to overcome some of the deficiencies of wired charging solutions. Additionally, wireless charging system should be capable of coordinating multiple base pads to properly coordinate the transfer of power continuously to a moving receiver over an extended distance of travel in a practical manner.

SUMMARY OF THE INVENTION

The embodiments disclosed herein each have several innovative aspects, no single one of which is solely responsible for the desirable attributes of the invention. Without limiting the scope, as expressed by the claims that follow, the more prominent features will be briefly disclosed here. After considering this discussion, one will understand how the features of the various embodiments provide several advantages over current dynamic wireless charging systems.

One embodiment of this invention comprises a device for charging an electric vehicle, the device comprising a plurality of charging coils configured to charge the electric vehicle and at least one control circuit configured to provide power to the plurality of charging coils in a first sequence and a second sequence. The first sequence may be configured to activate at least one of the plurality of charging coils in a first order with a first direction of current flow and the second sequence may be configured to activate at least one of the plurality of charging coils with at least one of a different order or a different direction of current flow than the first sequence.

Another embodiment of this invention may comprise a method for charging an electric vehicle, the method comprising selecting a first sequence from a plurality of sequences of charging coil activation steps and activating at least one charging coil of a plurality of charging coils in a first order with a first direction of current flow based on the first sequence. Each of the sequences of the plurality of sequences of charging coil activation steps may comprise activating the at least one charging coil with at least one of a different order or a different direction of current flow than the other sequences of charging coil activations steps of the plurality of sequences.

An additional embodiment may comprise device for charging an electric vehicle, the device comprising a plurality of means for providing a charge to the electric vehicle and at least one means for providing power to the plurality of means for providing a charge based on a first sequence of a plurality of sequences of charge providing means activation steps, the first sequence configured to activate at least one of the plurality of charge providing means in a first order with a first direction of current flow. Each of the sequences of the plurality of sequences of charge providing means activation steps comprises activating the at least one charge providing means with at least one of a different order or a different direction of current flow than the other sequences of charge providing means activations steps of the plurality of sequences.

BRIEF DESCRIPTION OF THE DRAWINGS

The above-mentioned aspects, as well as other features, aspects, and advantages of the present technology will now be described in connection with various embodiments, with reference to the accompanying drawings. The illustrated embodiments, however, are merely examples and are not intended to be limiting. Throughout the drawings, similar symbols typically identify similar components, unless context dictates otherwise. Note that the relative dimensions of the following figures may not be drawn to scale.

DETAILED DESCRIPTION OF THE PREFERRED EMBODIMENT

Figure 1:
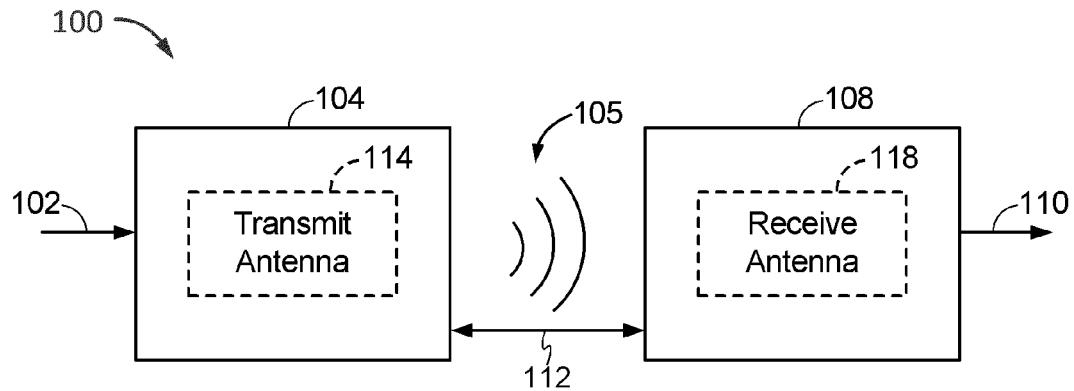
FIG. 1 is a functional block diagram of a wireless power transfer system, in accordance with one implementation.

In the following detailed description, reference is made to the accompanying drawings, which form a part of the present disclosure. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and form part of this disclosure.

Wireless power transfer may refer to transferring any form of energy associated with electric fields, magnetic fields, electromagnetic fields, or otherwise from a transmitter to a receiver without the use of physical electrical conductors (e.g., power may be transferred through free space). The power output into a wireless field (e.g., a magnetic field or an electromagnetic field) may be received, captured by, or coupled by a "receive antenna" to achieve power transfer.

An electric vehicle is used herein to describe a remote system, an example of which is a vehicle that includes, as part of its motion capabilities, electrical power derived from a chargeable energy storage device (e.g., one or more rechargeable electrochemical cells or other type of battery). As non-limiting examples, some electric vehicle may be hybrid electric vehicles that include besides electric motors, a traditional combustion engine for direct locomotion or to charge the vehicle's battery. Other electric vehicles may draw all locomotion ability from electrical power. The electric vehicle is not limited to an automobile and may include motorcycles, carts, scooters, and the like. By way of example and not limitation, a remote system is described herein in the form of the electric vehicle (EV). Furthermore, other remote systems that may be at least partially powered using a chargeable energy storage device are also contemplated (e.g., electronic devices such as personal computing devices and the like).

The terminology used herein is for the purpose of describing particular embodiments only and is not intended to be limiting of the disclosure. It will be understood by those within the art that if a specific number of a claim element is intended, such intent will be explicitly recited in the claim, and in the absence of such recitation, no such intent is present. For example, as used herein, the singular forms "a", "an" and "the" are intended to include the plural forms as well, unless the context clearly indicates otherwise. As used herein, the term "and/or" includes any and all combinations of one or more of the associated listed items. It will be further understood that the terms "comprises," "comprising," "includes," and "including," when used in this specification, specify the presence of stated features, integers, steps, operations, elements, and/or components, but do not preclude the presence or addition of one or more other features, integers, steps, operations, elements, components, and/or groups thereof. Expressions such as "at least one of," when preceding a list of elements, modify the entire list of elements and do not modify the individual elements of the list.

FIG. 1 is a functional block diagram of a wireless power transfer system 100, in accordance with one implementation. An input power 102 may be provided to a transmitter 104 from a power source (not shown in this figure) to generate a wireless (e.g., magnetic or electromagnetic) field 105 for performing energy transfer. A receiver 108 may couple to the wireless field 105 and generate an output power 110 for storing or consumption by a device (not shown in this figure) coupled to the output power 110. Both the transmitter 104 and the receiver 108 are separated by a distance 112.

In one implementation, the transmitter 104 and the receiver 108 are configured according to a mutual resonant relationship. When the resonant frequency of the receiver 108 and the resonant frequency of the transmitter 104 are substantially the same or very close, transmission losses between the transmitter 104 and the receiver 108 are minimal. As such, wireless power transfer may be provided over a larger distance in contrast to purely inductive solutions that may require large antenna coils which are very close (e.g., sometimes within millimeters). Resonant inductive coupling techniques may thus allow for improved efficiency and power transfer over various distances and with a variety of inductive coil configurations.

The receiver 108 may receive power when the receiver 108 is located in the wireless field 105 produced by the transmitter 104. The wireless field 105 corresponds to a region where energy output by the transmitter 104 may be captured by the receiver 108. The wireless field 105 may correspond to the "near-field" of the transmitter 104 as will be further described below. The transmitter 104 may include a transmit antenna or coil 114 for transmitting energy to the receiver 108. The receiver 108 may include a receive antenna or coil 118 for receiving or capturing energy transmitted from the transmitter 104. The near-field may correspond to a region in which there are strong reactive fields resulting from the currents and charges in the transmit coil 114 that minimally radiate power away from the transmit coil 114. The near-field may correspond to a region that is within about one wavelength (or a fraction thereof) of the transmit coil 114.

As described above, efficient energy transfer may occur by coupling a large portion of the energy in the wireless field 105 to the receive coil 118 rather than propagating most of the energy in an electromagnetic wave to the far field. When positioned within the wireless field 105, a "coupling mode" may be developed between the transmit coil 114 and the receive coil 118. The area around the transmit antenna 114 and the receive antenna 118 where this coupling may occur is referred to herein as a coupling-mode region.

Figure 2:
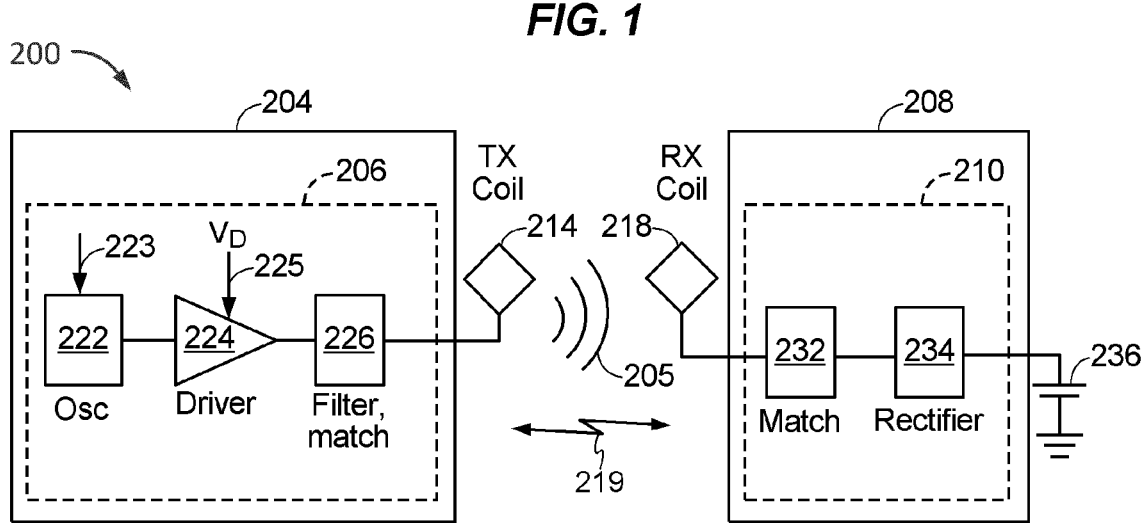
FIG. 2 is a functional block diagram of a wireless power transfer system, in accordance with another implementation.

FIG. 2 is a functional block diagram of a wireless power transfer system 200, in accordance with another implementation. The system 200 includes a transmitter 204 and a receiver 208. The transmitter 204 may include a transmit circuitry 206 that may include an oscillator 222, a driver circuit 224, and a filter and matching circuit 226. The oscillator 222 may be configured to generate a signal at a desired frequency that may be adjusted in response to a frequency control signal 223. The oscillator 222 may provide the oscillator signal to the driver circuit 224. The driver circuit 224 may be configured to drive the transmit antenna 214 at, for example, a resonant frequency of the transmit antenna 214 based on an input voltage signal (VD) 225. The driver circuit 224 may be a switching amplifier configured to receive a square wave from the oscillator 222 and output a sine wave. For example, the driver circuit 224 may be a class E amplifier.

The filter and matching circuit 226 may filter out harmonics or other unwanted frequencies and match the impedance of the transmitter 204 to the transmit antenna 214. As a result of driving the transmit antenna 214, the transmit antenna 214 may generate a wireless field 205 to wirelessly output power at a level sufficient for charging a battery 236 of the electric vehicle 605, for example.

The receiver 208 may include a receive circuitry 210 that may include a matching circuit 232 and a rectifier circuit 234. The matching circuit 232 may match the impedance of the receive circuitry 210 to the receive antenna 218. The rectifier circuit 234 may generate a direct current (DC) power output from an alternate current (AC) power input to charge the battery 236, as shown in FIG. 2. The receiver 208 and the transmitter 204 may additionally communicate on a separate communication channel 219 (e.g., Bluetooth, Zigbee, cellular, etc). The receiver 208 and the transmitter 204 may alternatively communicate via in-band signaling using characteristics of the wireless field 205.

The receiver 208 may be configured to determine whether an amount of power transmitted by the transmitter 204 and received by the receiver 208 is appropriate for charging the battery 236.

Figure 3:
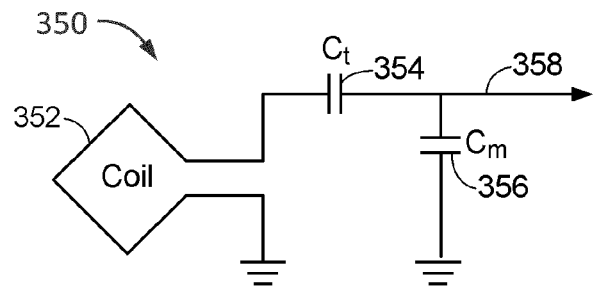
FIG. 3 is a schematic diagram of a portion of transmit circuitry or receive circuitry of FIG. 2 including a transmit or receive antenna, in accordance with example implementations.

FIG. 3 is a schematic diagram of a portion of the transmit circuitry 206 or the receive circuitry 210 of FIG. 2, in accordance with example implementations. As illustrated in FIG. 3, a transmit or receive circuitry 350 may include an antenna 352. The antenna 352 may also be referred to or be configured as a "loop" antenna 352. The antenna 352 may also be referred to herein or be configured as a "magnetic" antenna or an induction coil. The term "antenna" generally refers to a component that may wirelessly output or receive energy for coupling to another "antenna." The antenna may also be referred to as a coil of a type that is configured to wirelessly output or receive power. As used herein, the antenna 352 is an example of a "power transfer component" of a type that is configured to wirelessly output and/or receive power.

The antenna 352 may include an air core or a physical core such as a ferrite core (not shown in this figure). Air core loop antennas may be more tolerable to extraneous physical devices placed in the vicinity of the core. Furthermore, an air core loop antenna 352 allows the placement of other components within the core area. In addition, an air core loop may more readily enable placement of the receive antenna 218 (FIG. 2) within a plane of the transmit antenna 214 (FIG. 2) where the coupled-mode region of the transmit antenna 214 may be more powerful.

As stated, efficient transfer of energy between the transmitter 104 (transmitter 204 as referenced in FIG. 2) and the receiver 108 (receiver 208 as referenced in FIG. 2) may occur during matched or nearly matched resonance between the transmitter 104 and the receiver 108. However, even when resonance between the transmitter 104 and receiver 108 are not matched, energy may be transferred, although the efficiency may be affected. For example, the efficiency may be less when resonance is not matched. Transfer of energy occurs by coupling energy from the wireless field 105 (wireless field 205 as referenced in FIG. 2) of the transmit coil 114 (transmit coil 214 as referenced in FIG. 2) to the receive coil 118 (receive coil 218 as referenced in FIG. 2), residing in the vicinity of the wireless field 105, rather than propagating the energy from the transmit coil 114 into free space.

The resonant frequency of the loop or magnetic antennas is based on the inductance and capacitance. Inductance may be simply the inductance created by the antenna 352, whereas, capacitance may be added to the antenna's inductance to create a resonant structure at a desired resonant frequency. As a non-limiting example, a capacitor 354 and a capacitor 356 may be added to the transmit or receive circuitry 350 to create a resonant circuit that selects a signal 358 at a resonant frequency. Accordingly, for larger diameter antennas, the size of capacitance needed to sustain resonance may decrease as the diameter or inductance of the loop increases.

Furthermore, as the diameter of the antenna increases, the efficient energy transfer area of the near-field may increase. Other resonant circuits formed using other components are also possible. As another non-limiting example, a capacitor may be placed in parallel between the two terminals of the circuitry 350. For transmit antennas, the signal 358, with a frequency that substantially corresponds to the resonant frequency of the antenna 352, may be an input to the antenna 352.

In FIG. 1, the transmitter 104 may output a time varying magnetic (or electromagnetic) field with a frequency corresponding to the resonant frequency of the transmit coil 114. When the receiver 108 is within the wireless field 105, the time varying magnetic (or electromagnetic) field may induce a current in the receive coil 118. As described above, if the receive coil 118 is configured to resonate at the frequency of the transmit coil 114, energy may be efficiently transferred. The AC signal induced in the receive coil 118 may be rectified as described above to produce a DC signal that may be provided to charge or to power a load.

Many current wireless vehicle charging systems require the electric vehicle being charged to be stationary, i.e., stopped near or above the wireless charging system such that the electric vehicle maintains presence within the wireless field generated by the wireless charging system for transferring charge. Thus, while the electric vehicle is being charged by such a wireless charging system, the electric vehicle may not be used for transportation. Dynamic wireless charging systems that are capable of transferring power across free space may overcome some of the deficiencies of stationary wireless charging stations.

On a roadway with a dynamic wireless charging system comprising a plurality of the base pads placed linearly along a path of travel, the electric vehicle may travel near the plurality of the base pads while traveling on the road. Should the electric vehicle desire to charge its batteries or source energy to power the electric vehicle while traveling, in order to extend its range or reduce the need to charge later, the electric vehicle may request the dynamic wireless charging system activate the base pads along the electric vehicle's path of travel. Such dynamic charging may also serve to reduce or eliminate the need for auxiliary or supplemental motor systems in addition to the electric locomotion system of the electric vehicle (e.g., a secondary gasoline engine of the hybrid/electric vehicle). As such, dynamic wireless charging systems and methods that efficiently and effectively activate the base pads along a path of travel of the electric vehicle are needed.

Figure 4:
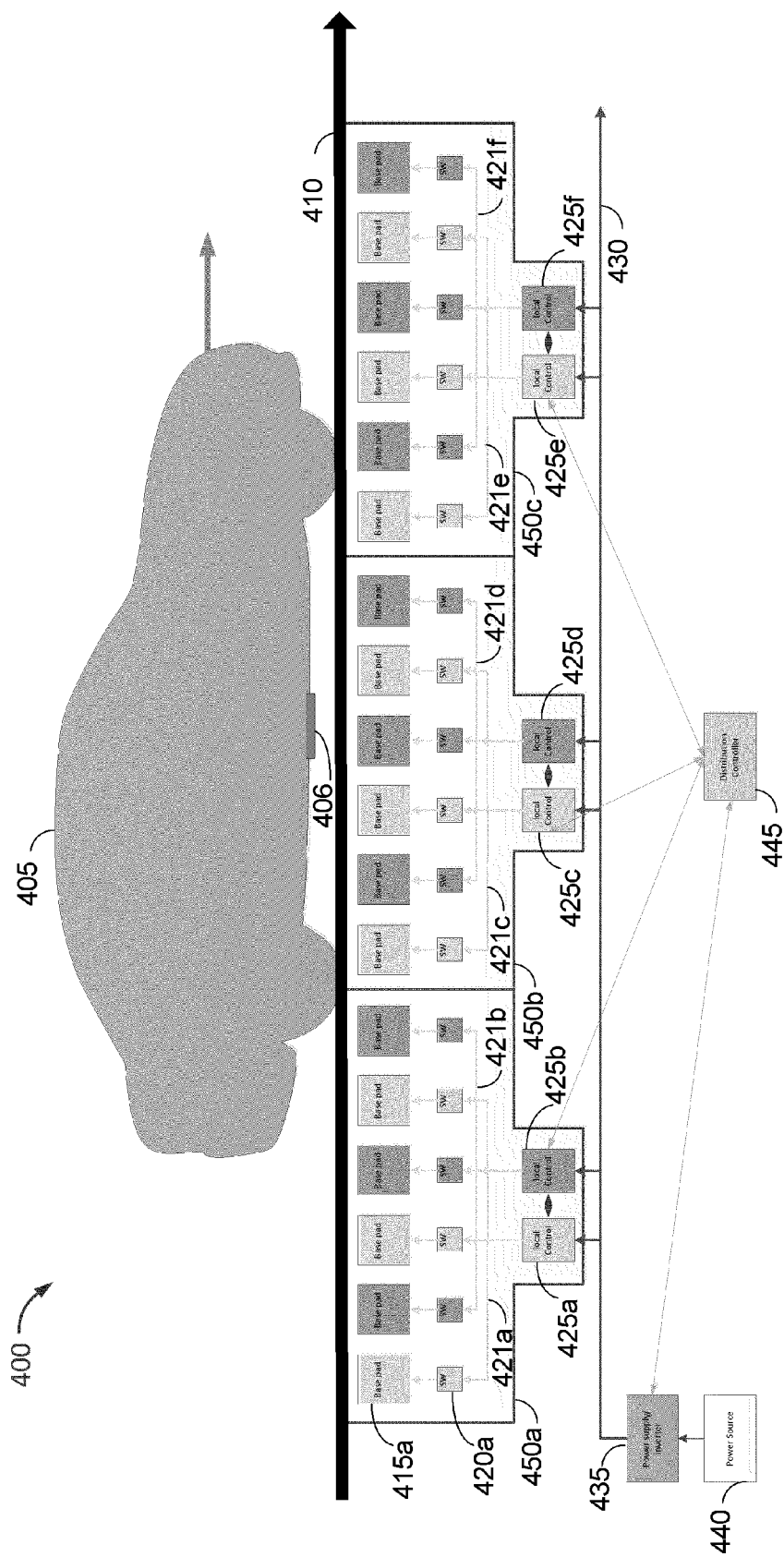
FIG. 4 illustrates a schematic view of an electric vehicle with at least one vehicle pad traveling along a roadway where various components of a dynamic wireless charging system are installed beneath or along the roadway.

FIG. 4 illustrates a schematic view of an electric vehicle 405 with at least one vehicle pad 406 traveling along a roadway 410 where various components of a dynamic wireless charging system 400 are installed beneath or along the roadway 410. The roadway 410 is shown as extending from the left side of the page to the right side of the page, with the vehicle 405 traveling along the roadway 410 from the left to the right of the page in the direction of travel. As depicted in the figure, the electric vehicle is passing above the base pads 415 as installed in the roadway 410. In an alternate embodiment, the base pads 415 may be installed on top of the surface of the roadway 410, beside the roadway 410, or flush with the surface of the roadway 410, or in any embodiment which would allow the wireless transfer of energy to electric vehicles 405 traveling along the roadway 410.

The base pads 415a-415r may emit a wireless field (not shown in this figure) when activated and wirelessly transfer power to the electric vehicle 405 via at least one vehicle pad 406. In some embodiments, the base pads 415a-415r may be activated independently from one another. In some other embodiments, the base pads 415a-415r may be activated in combinations of one or more base pads 415 at the same time. In other embodiments, the base pads 415a-415r may be activated dependent on one another. The base pads 415a-415r of FIG. 4 may be depicted as being adjacent to each other. In another embodiment, the base pads 415a-415r may be installed in an overlapping manner (as referenced in FIG. 7a). In some other embodiment, the base pads 415 may be installed in a manner where some base pads 415 overlap with other base pads 415 while other base pads 415 may be adjacent to without overlapping other base pads 415. As depicted, groups of base pads 415, switches 420, and local controllers 425 may be components of Base Array Network (BAN) modules 450a-450c. As shown, the respective components of the BAN modules 450 are shaded to indicate respective power paths.

A base pad 415 may comprise a coil capable of generating a wireless field (not shown here) for transferring power wirelessly. In some embodiments, the base pad 415 may comprise an apparatus that is configured to generate the wireless field for transferring wireless power; the apparatus may comprise one or more inductive coils or other devices capable of generating the wireless field. In some other embodiments, the base pad 415 may refer to the individual inductive coils or similar devices capable of generating the wireless field for wireless power distribution. Any structure capable of generating the wireless field to transfer power wirelessly may function as the base pad 415 in the system described herein. Similarly, a vehicle pad, as will be discussed below, may similarly describe an apparatus comprising at least one inductive coil or similar device or may indicate the inductive coil or similar device directly.

The electric vehicle 405 of FIG. 4 may comprise one or more vehicle pads 406, and may be traveling along the roadway 410 above the base pads 415. Each of the base pads 415a-415r may be connected to a switch 420a-420r, which may couple each of the base pads 415a-415r to a local controller 425a-425f via a distribution circuit 421a-421f. Each of the local controllers 425a-425f may be connected to a backbone 430, which may itself be connected to a power supply/inverter 435. The power supply/inverter 435 may be connected to a power source 440. Additionally, local controllers 425a-425f and power supply/inverter 435 may be connected to a distribution controller 445 for communications and control. In another embodiment, the distribution controller 445 may also be connected to the electric vehicle 405. In some embodiments, the communications and control connection between the distribution controller 445, the local controller 425, the power supply/inverter 435, and electric vehicle 405 may be wireless, such that the distribution controller 425 and the electric vehicle 405 need not be physically connected, or wired. In some additional embodiments, the distribution controller 445 may be integrated into the local controllers 425 or any of the power generating devices (power supply/inverter 435 and power source 440).

As discussed above, the electric vehicle 405 of FIG. 4 may comprise at least one vehicle pad 406. The at least one vehicle pad may be configured to receive wireless power when coupled to a base pad 415. In some embodiments, the vehicle pad 406 may refer to the apparatus of the electric vehicle 405 that enables the electric vehicle 405 to receive wireless power from base pads 415. In some embodiments, the vehicle pad 406 may refer to the one or more coils located at a specific position of the electric vehicle 405. For example, the vehicle pad 406 may comprise a double-D and a quadrature coil. In other embodiments, the vehicle pad 406 may refer specifically to the one or more coils that couple with the base pads 415 to enable wireless power transfer to the electric vehicle 405. The wireless power received via the vehicle pad 406 may be utilized to charge an energy storage device (e.g., a battery) (not shown in this figure) or to power electronics of the electric vehicle 405 (not shown in this figure) or to provide locomotion energy to the electric vehicle 405. Each of the base pads 415a-415r may generate a wireless field (not shown in this figure). The base pads 415a-415r may couple with vehicle pads 406 passing through the wireless field generated by the base pad 415 and may wirelessly transfer power from the base pads 415 to the vehicle pad 406, where the wireless power may be used by the systems of the electric vehicle 405. In an embodiment, the vehicle pad 406 may comprise one or more vehicle pads 406 positioned at one or more locations along the electric vehicle 405. In an embodiment, the positions of the vehicle pads 406 on the electric vehicle 406 may be determined by the positioning of the base pads 415 in relation to the roadway 410 and the electric vehicle 405 path of travel. In some embodiments, the vehicle pads 406 may comprise at least one of a polarized coupling system (e.g., a double-D coil) and a quadrature coil. In another embodiment, the vehicle pads 406 may comprise combined double-D quadrature coils. In some other embodiments, the vehicle pads 406 may comprise coils of another type. In some other embodiments, the vehicle pads 406 may comprise one of circular coils and solenoidal coils, or a combination of any of the above mentioned coils.

Each of the base pads 415a-415r may be connected to a switch 420a-420r, which may couple each of the base pads 415a-415r to a local controller 425a-425f via a distribution circuit 421a-421f. The distribution circuits 421 may comprise the wiring or other circuitry necessary which physically connect the local controllers 425a-425f and the switches 420a-420r and base pads 415a-415r and allows the local controllers 425 to distribute current to the base pads 415 as needed to provide charging power to an electric vehicle 405. Switches 420a-420r may comprise a device or circuitry that allows current from the local controller 425 to pass to the base pad 415a-415r to which the switch 420 is connected. In an embodiment, when the local controller 425 draws current from the backbone 430 to distribute it to one of the connected base pads 415, the local controller 425 may distribute the current to the entire distribution circuit 421. As a result, the switches 420 that connect the base pads 415 to the distribution circuit 421 may be configured to receive a signal from the local controller 425 directing one of the switches 420a-420r to couple it base pad 415a-415r to the distribution circuit 421a-421f to receive the current and generate a wireless field to transmit power wirelessly to a passing electric vehicle. Each of the local controllers 425a-425f may be connected to a backbone 430, which may itself be connected to a power supply/inverter 435, which may be connected to a power source 440. Additionally, local controllers 425a-425f and power supply/inverter 435 may be connected to a distribution controller 425. In another embodiment, the distribution controller 425 may also be connected to the electric vehicle 405. In some embodiments, the connection between the distribution controller 425 and electric vehicle 405 (not shown in this figure) may be wireless such that the distribution controller 425 and the electric vehicle 405 need not be physically connected or wired.

In operation, the electric vehicle 405 may travel along the roadway 410 with its vehicle pad 406 positioned to receive power from the base pads 415. The base pads 415 may couple with vehicle pads 406 and may wirelessly transfer power from the base pads 415 to the vehicle pad 406. The level of the coupling between the base pads 415 and the vehicle pad 406 may impact the amount of power transferred or the efficiency with which the power is transferred to the electric vehicle 405 via the wireless field.

The base pads 415a-415r may generate wireless fields and couple with vehicle pad 406 that pass through wireless fields. When coupled to vehicle pad 406, a base pad 415 may wirelessly transfer power to the vehicle pad 406.

The switches 420a-420r may control the flow of current from the distribution circuits 421a-421f and the local controllers 425a-425f to the respective base pads 415a-415r connected downstream of the switches 420a-420r. Switches 420a-420r may comprise a device or circuitry that allows current from the local controller 425 to pass to the respective base pad 415a-415r to which the switch 420 is connected, based on a signal from the local controller 425. In another embodiment, the switch 420 may pass current on to the connected base pad 415 in response to a signal from the distribution controller 445. In some embodiments, the switch 420 may pass current to the base pad 415 by default without receiving a signal from another device. In an embodiment, when the local controller 425 draws current from the backbone 430 to distribute it to one of the connected base pads 415, the local controller 425 may distribute the current to the entire distribution circuit 421. In that embodiment, switches 420 may be used to couple specific base pads 415 to the current of the distribution circuit 421 based upon the signal or the default condition. In another embodiment, the distribution circuits 421 may comprise the wiring or other circuitry necessary to connect individual switches 420 to the local controllers 425 based on what base pads 415 are to receive current. The distribution circuits 421 may comprise the wiring and/or circuit necessary to physically connect the local controllers 425a-425f to the switches 420a-420r and base pads 415a-415r and allows the local controllers 425 to distribute current to the base pads 415 as needed to provide charging power to an electric vehicle 405. In an embodiment, the local controllers 425a-425f may control a current flow to the base pads 415a-415r and may control the direction of the current flow through the base pads 415a-415r. In an alternate embodiment, the switch 420a-420r may control the direction, the magnitude, and/or the phase of the current flow through the base pads 415a-415r.

The local controllers 425a-425f may receive current from a backbone 430, which may connect the local controllers to the power supply/inverter 435 and power source 440. In addition to distributing current from the backbone 430 to the base pads 415, the local controllers 425 may tune the distribution circuit 421 and corresponding output currents to the connected base pads 415. In some embodiments, the local controllers 425 in each BAN module 450 may comprise individual control units capable of independent control from each other. In some other embodiments, the local controllers 425 may in each BAN module 450 may comprise a single, shared control unit or processor that controls both of the local controllers 425 while each local controller maintains independent power distribution components and power inputs from the backbone 435 and the ability to operate and function independently from the operation of the other local controller 425 though sharing a single processor. The two local controllers 425 in each BAN module 450a-450c, respectfully pairs 425a and 425b, 425c and 425d, and 425e and 425f may provide for a parallel power distribution path internal to BAN modules 450a, 450b, and 450c, such that two base pads 415 controlled by the two local controllers 425 within each BAN module 450 may be activated at the same time without requiring a single local controller 425 to provide power to more than one base pad 415 at a given moment.

The backbone 430 may distribute the current from the power supply/inverter 435 along a length of roadway 410 to multiple local controllers 425. Distribution controller 445 may operate to control the activation of individual base pads 415 as an electric vehicle 405 travels along the roadway 410 using dynamic wireless charging system 400. The distribution controller 445 may provide controls to the power source 440 and power supply/inverter 435 based upon the demand of the base pads 415 and the need to provide a transfer of power at a given moment. In another embodiment, the distribution controller 445 may simply coordinate communications between BAN modules 450 or local controllers 425. In some other embodiment, the distribution controller 445 may activate the BAN module 450, but leave the timing of base pad 415 activations to the local controller 425. Alternatively, the distribution controller 445 may communicate only non-critical information to the local controllers 425 and not provide base pad 415 activation information.

In some embodiments, the order of base pad activations may be according to a pre-set sequence or algorithm based upon parameters of the electric vehicle 405, where the local controller 425 or the distribution controller 445 may choose between the established sequences according to the electric vehicle 405 parameters. Some examples of the electric vehicle 405 parameters may include the charging requirements, the configuration or type of vehicle pads 406, size or height of the vehicle pads, the speed, the position, the velocity, and direction of the electric vehicle 405. In some other embodiments, the local controller 425 or the distribution controller 445 may dynamically sequence through the steps of established sequences, being capable of selecting a sequence but then jumping to various steps of the sequence according to immediate needs and updated parameters of the electric vehicle 405 and the dynamic wireless charging system 400. In some other embodiments, a sequence of base pad 415 activation may be generated according to an algorithm that may be developed according to the parameters of the electric vehicle 405 to be charged as the dynamic wireless charging system 400 prepares to charge the electric vehicle 405. In embodiments, the algorithm may function to maximize wireless power transfer to the electric vehicle 405. In some embodiments, the local controller 425 or the distribution controller 445 may jump to different steps of the current sequence or develop a new sequence based upon the algorithm and the parameters of the electric vehicle 405. In some embodiments, the sequence may comprise a plurality of individual steps, each individual step comprising a set of one or more base pads 415 being activated at a time.

Such an installation and connection pattern as described above may allow each local controller 425 to provide current to only one base pad 415 at a given moment, even if two consecutive base pads 415 are active at the same time. The base pads 415 receiving power from the pairs of local controllers 425 may be interleaved so that no local controller 425 distributes power to any two consecutive base pads 415. The backbone 430 may distribute the current from the power supply/inverter 435 along a length of roadway 410 to multiple local controllers 425. Distribution controller 445 may operate to control the activation of individual base pads 415 as an electric vehicle 405 travels along the dynamic wireless charging system 400. The distribution controller 445 may provide controls to the power source 440 and power supply/inverter 435 based upon the demand of the base pads 415 and the need to provide a transfer of power at a given moment.

In operation, the electric vehicle 405 or its operator may determine that utilizing the dynamic wireless charging system 400 is beneficial. In some embodiments, utilizing the dynamic wireless charging system 400 may require preliminary communications between the electric vehicle 405 and the charging system 400. These initial communications may involve the distribution controller 445. These communications may initiate the charging procedure for both the electric vehicle 405 and the dynamic wireless charging system 400 and verify the electric vehicle 405 may use the dynamic wireless charging system 400. Additionally, the preliminary communications may involve activating the vehicle pad 406 of the electric vehicle 405 and indicating to the electric vehicle 405 or its operator the proper alignment of the path of travel of the electric vehicle 405 so it may travel above the base pads 415a-415r. As the electric vehicle 405 passes above each base pad 415a-415r, the vehicle pad 406 of the electric vehicle 405 may pass through the wireless fields generated by the base pads 415a-415r. In an alternate embodiment, the distribution controller 445 may not be involved with the initial communications and may instead only be involved with communicating with the electric vehicle 405 to determine the electric vehicle 405 position within the dynamic wireless charging system 400 as it travels above the base pads 415a-415r.

While passing through the wireless fields, the vehicle pad 406 may be selectively connected to a charging circuit (not shown in this figure) configured to charge the energy storage device using energy received by the vehicle pad 406 and directly to the electric vehicle 405 to selectively power the electronics of the electric vehicle 405 and provide power for locomotion. These selections may be made by the operator of the electric vehicle 405, by the electric vehicle 405, or by the dynamic wireless charging system 400. Thus, the wireless power received by the vehicle pad 406 may enable the electric vehicle 405 to extend its range and minimize its need for a subsequent charging cycle. The level of the coupling between the base pads 415 and the vehicle pad 406 may impact the amount of power transferred or the efficiency with which the power is transferred to the electric vehicle 405 via the wireless field.

As the electric vehicle 405 and vehicle pad 406 travel through the dynamic wireless charging system 400 and above individual base pads 415a-415r, distribution controller 445 may communicate with the electric vehicle 405, the power supply/inverter 435, and the local controllers 425a-425f. Dependent upon the position of the electric vehicle 406 in relation to the dynamic wireless charging system 400, the distribution controller 445 may instruct the power supply/inverter 435 to generate a current and distribute it to the backbone 430. The backbone 430 may serve to supply all connected local controllers 425a-425f with current which may be further distributed to the base pads 415a-415r to wirelessly transfer power to an electric vehicle 405. If the electric vehicle 405 is nearing or within the vicinity of the dynamic wireless charging system 400, the distribution controller 445 may command the power supply/inverter 435 generate a current in the backbone 430. In some embodiments, backbone 430 may be a loop conductor that distributes the high frequency (HF) power and may be capable of synchronizing base pads that are near each other to a single phase. In an embodiment, the backbone 430 may be constructed in a manner such that the local controllers 425 and any other devices sourcing power from the backbone 430 by coupling with the backbone 430 wirelessly. This wireless coupling may be similar to the coupling seen in transformers or in wireless charging. A wireless connection between the backbone 430 and the local controllers 425 may provide the ability to locate the local controllers 425 anywhere along the backbone 430 or easily move the local controllers 425 without requiring any physical modifications to either component. In another embodiment, the backbone 430 may be constructed such that local controllers 425 and any other devices sourcing power from the backbone 430 physically connect to the backbone via an electrical connection. An alternate embodiment may utilize a combination of wireless and physical connections between the backbone 430 and local controllers 425. The length of the backbone 430 may be limited only by the current demand of the connected BAN modules 450/local controllers 425 and the power supply 440 output. Accordingly, the backbone 430 may be of any length such that the current supplied to the local controllers 425 may not be deteriorated or degraded due to interference or distance of transmission so as to make the current unusable by the local controllers 425, switches 420, or base pads 415 or such that the current supplied to the base pads 415 may not create difficulty for generating wireless fields with the current, for example, if the required voltage becomes too high. The backbone 430 may be a loop conductor that distributes the high frequency (HF) power and may be capable of synchronizing base pads that are in a vicinity to a single phase. The backbone 430 may be considered a phase reference that also distributes the power. Accordingly, the backbone 430 may be used for phase measurements or for keeping associated components (e.g., local controllers 425) in phase alignment. Additionally, the backbone 430 may have a constant magnitude, which may provide for the measuring of real power draw, etc., of associated components.

After activating the power supply/inverter 435, the distribution controller 445 may obtain information regarding the vector or path of the electric vehicle 405 and the speed of the electric vehicle 405. The distribution controller 445 may obtain this information from the electric vehicle 405 itself or from various sensors or load analysis of the base pads 415. In relation to the location of the electric vehicle 405 and the vehicle pad 406, the distribution controller 445 may send signals to the local controllers 425 in the vicinity of the electric vehicle 405 to activate specific base pads 415 dependent upon the location of the electric vehicle 405 at a moment in time. For example, as indicated by the moment captured in FIG. 4, the distribution controller 445 may be communicating with the electric vehicle 405 to determine the position of the vehicle pad 406 in relation to the dynamic wireless charging system 400, local controllers 425c and 425d to command them to activate base pads 415j and 415k to wirelessly transfer power to the vehicle pad 406. As the electric vehicle 405 continues to travel down the road towards the right side of the page, the distribution controller 445 may continue to communicate with the electric vehicle 405 and successively send commands to local controllers 425c-425f so as to activate base pads 415l-415r at the appropriate times according to when the electric vehicle 405 is above the respective base pad 415. In an alternate embodiment, distribution controller 445 may communicate with local controllers 425 down the roadway 410 to coordinate power transfers to the electric vehicle 405. As another alternative, each of the BAN modules 450 may sense the presence of the electric vehicle 405 and autonomously and selectively activate one of the base pads 415 based on a detected presence of the electric vehicle 405. In another embodiment, the BAN modules 450 may receive a signal from a neighboring BAN module 450. This signal may comprise information regarding the electric vehicle 405 speed, position, and direction, or may comprise a signal to activate. The received signal may come directly from the neighboring BAN module 450 or via the distributed controller 445. In another alternative, a local controller 425 in a BAN module 450 may receive or send signals to local controllers 425 in neighboring BAN modules 450 to determine when to activate and deactivate base pads 415.

When the local controllers 425a-425f receive a signal from the distribution controller 445 to activate a specific base pad 415, the respective local controller 425 that is connected to the base pad 415 to be activated may generate a signal to the switch 420 that is between the base pad 415 to be activated and the local controller 425. For example, at the moment depicted in FIG. 4, local controller 425c may receive a signal from the distribution controller 445 to activate base pads 415i. While this signal is received, the local controller 425c may be configured to generate a signal to the switch 420i to instruct the switch 420i to connect base pad 415i to the distribution circuit 421c. In another embodiment, the local controller 425 may send the received signal on to the switch 420. In some other embodiment, distribution controller 445 may communicate directly with the switch 420 and the local controller 425. At the same time, local controller 425d may be receiving a signal from the distribution controller 445, which may cause the local controller 425d to generate a signal to the switch 420j to instruct the switch 420j to connect base pad 415j to the distribution circuit 421d. As the vehicle 405 continues in the direction of travel, local controller 425d-425f may receive commands from the distribution controller 445 to activate specific base pads 415k-415r. In response to the commands, the specific local controller 425 that distributes power to the indicated base pad 415 may instruct the switch 415 corresponding to the base pad 415 to connect the base pad 415 to the respective distribution circuit 421d-421f. The local controllers 425a-425f may further control the current from the backbone 430 or may regulate the current from the backbone 430. Additionally, the local controller 425 may produce a variable output current from the backbone 430 current. For example, the local controller may produce any amount of output current between zero and the maximum current available at the backbone 430 to feed to the base pads 415, e.g., the local controller may produce anywhere between 0% and 100% of the coupled voltage or current form the backbone 430 to provide to the base pads 415.

In some embodiments, the local controllers 425a and 425b may not receive a distribution signal, and instead may receive a current only when they are to distribute the current to a downstream component. In some other embodiments, the local controllers 425a and 425b may not receive a current but rather be configured to generate a current from an input power in response to a distribution signal or in response to an input power being provided. In some other embodiments, the local controllers 425 may be a combination of a power supply/inverter 435 and current distribution equipment, and may be configured to provide power to a base pad 415 upon its own determination of when to activate base pads 415 (e.g., using load monitoring or direct communications with the electric vehicle 405). In an additional embodiment, the local controller 425 may be configured to provide power to the base pads 415 in response to a signal from the electric vehicle 405. The signal from the electric vehicle 405 may comprise a direct communication from the electric vehicle 405 to the local controller 425 via wireless communications (e.g., Bluetooth, Wi-Fi, etc.). In another embodiment, the local controller 425 may be configured to provide power to the base pads 415 in response to a load monitoring communication or signal, wherein the base pads 415 may determine the existence or position of the electric vehicle 405 based on the load of the electric vehicle 405 via vehicle pad 406 at the base pads 415. In some other embodiments, the local controller 425 may receive a signal to provide power to the base pads 415 that may be generated by a component of the previous BAN module 450 (e.g., base pad 415 or local controller 425 of a previous BAN module 450) that is communicated to the current local controller 425. This communication may be via any wired or wireless communication method. This communication may comprise information informing the current local controller 425 when to start providing power or may comprise information regarding the electric vehicle 405 position, speed, and/or direction. These communications may be direct between local controllers 425 of the same or different BAN modules 450, or may be directed through the distribution controller 445 and then to other local controllers 425. For example, in one embodiment, a local controller 425a within BAN module 450a may communicate to local controller 425b within BAN module 450a or local controller 425c within BAN module 450b to start charging. In another embodiment, the same local controller 425a may communicate to local controller 425b or local controller 425c information regarding the electric vehicle 405 speed, position, or direction.

Upon receipt of the current and the distribution signal, the local controller 425a may convey the current received from the backbone to the distribution circuit 421a. Similarly, the distribution signal received from the distribution controller 445 may comprise a signal indicating what base pads 415a-415f are to be activated at a given moment.

The distribution circuit 421a may then, as discussed in reference to FIG. 4, convey the current to all the switches 420 to which it is connected, e.g., switches 420a, 420c, and 420e. In some embodiments, the distribution circuit 421a itself may not comprise any internal controls or may be unable to direct the current in anything but a predetermined path or base pad activation sequence. In another embodiment, the distribution circuit 421a may comprise controls and components to allow it to selectively distribute the current along a dynamic path that the distribution circuit 421a may control. The switches 420a, 420c, and 420e may distribute received current to the respective base pads 415a, 415c, and 415e. The switches 420 may respond to a signal from the local controller 425 of distribution controller 445 to activate the base pad 415 to which the switch 420 is connected.

Such an installation and connection pattern as described above may allow each local controller 425 to provide current to only one base pad 415 at a given moment, even if two consecutive base pads 415 are active at the same time. The base pads 415 receiving power from the pairs of local controllers may be interleaved so that no local controller 425 distributes power to any two consecutive base pads 415. This may be beneficial in providing a smooth power transfer across multiple base pads 415 using lower rated components. The interleaving of the base pads 415 means that alternating base pads 415 are powered by different local controllers 425, and one local controller never needs to power two base pads 415. Providing a plurality of local controllers 425 that may feed multiple base pads 415 may provide for a more cost effective system where the local controllers 425 may be utilized in a more efficient manner as they may be in use while supplying current to multiple base pads 415. Additionally, preventing a single local controller 425 from providing current to consecutive base pads 415 helps reduce the power rating requirements of the all the components between the backbone 430 and the base pads 415, as each component therein need only be capable of handling the current load of a single base pad 415. In a non-parallel and non-interleaved distribution system, any device that may feed current to more than a single base pad 415 may need to be rated at the higher current required to feed two or more base pads 415 concurrently, as may be necessary to provide smooth power transfers across multiple base pads 415.

During this time, the distribution controller 445 may be continually sending a signal to the power supply/inverter 435 and/or power source 440, which may generate the high frequency current usable by the base pads 415 to generate wireless fields and wirelessly transmit power. In another embodiment, the power supply/inverter 435 may only require an on/off signal, such that the distribution controller 445 need not send a continuous signal the entire time the electric vehicle 405 is in the vicinity of the dynamic wireless charging system 400.

The base pads 415 may be connected to at least one local controller 425. The local controller 425 may control the current flow to and/or through the base pads 415. The local controller 425 may be configured to only provide current flow to a single base pad 415 at any given moment. Each base pad 415 may have at least one switch 420 between it and the local controller 425 which may be activated when the local controller 425 determines the base pad 415 connected to the respective switch 420 should receive current to generate a wireless field. Additionally, at least one of the local controller 425, the switch 420, the base pads 415, or the distribution circuit 421 may be configured to control the direction, the magnitude, and/or the phase of the current flow through the connected base pad 415. Such controlling by the distribution circuits 421, the local controllers 425, or the switches 420 may provide for the manipulation of the wireless fields generated by the base pads 415. In some embodiments, the phase of the current flow through the connected base pad 415 may be limited to one of zero or 180 degrees. In some other embodiments, the phase of the current flow may be any value between zero and 360 degrees. The control of the current flow direction through the base pad 415 may provide for minimizing mutual coupling and cross coupling between concurrently activated base pads 415 and adjacent base pads 415.

In some embodiments, the vehicle pads 406 may be installed near or at the front and rear axles of the electric vehicle 405. These installation points may be practical due to the physical space requirements of the vehicle pads 406 and a desire to distribute the power emissions a distance apart so the vehicle pads 406 do not cause interference with each other. In some embodiments, the vehicle pad pitch may be approximately 2.5 meters. In other embodiments, the vehicle pad pitch may be short as 1.75 meters or as long 4 meters, dependent upon the electric vehicle 405.

As discussed above, the parallel power distribution structure described within the BAN module 450 may restrict a local controller 425 within a BAN module 450 from providing power to at least two vehicle pads 406 concurrently due to the inability for a single local controller 425 to provide power to more than one base pad 415. Thus, the BAN module 450 length may be shorter than the length of a pitch between multiple vehicle pads. Additionally, the design of the BAN module 450 may additionally depend upon making the system cost effective and efficient. The BAN module 450 may contain a minimum number of base pads 415 so as to optimize the costs and investment of the power distribution components feeding the base pads 415. For example, constructing a BAN module 450 with only a single base pad 415 with a switch 420, distribution circuitry 421, and local controller 425, or even two base pads 415, may not be cost effective (two base pads may still require two switches 420, two distribution circuits 421, and two local controllers 425 due to the parallel distribution structure). A minimum amount of three or four base pads 415 per BAN module 450 may not significantly optimize the costs of components as each local controller 425 may only control one or two base pads 415 per BAN module 450, respectively, though this design may result in a reasonable BAN module 450 length, dependent upon the base pad 415 size, that likely would be less than a vehicle pad pitch. Eight base pads 415 per BAN module 450, while providing each local controller 425 with four base pads 415 to control and distribute power to, and making each BAN module 450 more cost efficient, may also increase the BAN module 450 length substantially such that it may exceed the vehicle pad pitch of 2.5 meters. Alternatively, reducing the size of the base pads 415 to accommodate eight base pads 415 per BAN module 450 in a length less than the vehicle pad pitch may reduce the base pad 415 effectiveness in transferring power and thus reduce base pad 415 and BAN module efficiency and cost effectiveness. Thus, in an example of an embodiment, six base pads 415 may be the ideal number of base pads 415 to install in each BAN module 450, and may provide an optimal comparison between component costs and ratings, current requirements, mutual inductances, and pads per meter, while maintaining a reasonable BAN module 450 length within the limits of the vehicle pad pitch. In another embodiment where the vehicle pad pitch may be greater or less than 2.5 m, a greater or lesser quantity of base pads 415 may be installed in the BAN module 450 to meet the constraints of the vehicle pad pitch.

When positioning the two or more vehicle pads 406, the pitch between the vehicle pads 406 may impact the efficacy of the total combined power transfer between the base pads 415 and the vehicle pads 406 at a given moment or position. In some embodiments, the vehicle pads 406 are spaced with a vehicle pad pitch equal to a multiple of the base pad pitch, e.g., the vehicle pad pitch may be four times the base pad pitch. With this ratio in vehicle pad pitch to the base pad pitch, the vehicle pads 406 are always coordinated with regards to their locations above the base pads 415. For example, when the first vehicle pad 406b is above base pad 415a and the vehicle pad pitch is four times the base pad pitch, the vehicle pad 406a is at the same point above base pad 415e, four base pads away. Thus, the two vehicle pads 406 will have the same points of low and high power transfer when they above the same points of the base pads 415 at the same time. Accordingly, both the combined power transfer from the vehicle pads 406 fluctuate greatly where they may each contribute a maximum power transfer at the same time (e.g., both vehicle pads 406 may be above the edges of their respective base pads 415) and contribute a minimum power transfer at the same time (e.g., both vehicle pads 406 may be above the centers of their respective base pads 415). Therefore, the power transfer curve for the combined vehicle pads 406 have highs where both vehicle pads 406 contribute their maximums and lows where both vehicle pads 406 contribute their minimums, and may not provide a smooth power transfer.

In another embodiment, the ratio between the vehicle pad pitch may be varied to be equal to a multiple of the base pad pitch plus a half of the base pitch (e.g., four and a half times the base pad pitch), such that the vehicle pads 406 are above different points of the base pads when receiving power at a given moment, and thus operate in a complementary manner—when one is in a maximum coupling position, the other is in a minimum. Thus, when the vehicle pad 406a may be contributing its maximum power transfer (above the edge of its base pad 415), vehicle pad 406b may be contributing its minimum (above the center of its base pad 415), and when vehicle pad 406a contributes is minimum power transfer (now above the center of a base pad 415), vehicle pad 406b may be contributing its maximum (above the edge of a base pad 415). Thus, the maximum power transfers of this embodiment may not be the highest attainable, but the power transfers may be smooth where the vehicle pads 406 alternate maximum and minimum power contributions and do not experience the same peaks and valleys in power transfer as may occur with vehicle pads 406 that are spaced with a vehicle pad pitch equal to a whole number ratio of the base pad pitch. Accordingly, an ideal vehicle pad pitch and base pad pitch ratio may be:

[Vehicle Pad Pitch=($N$+0.5)*Base Pad Pitch].

Ideally, the base pads 415 in BAN modules 450 would be able to overlap without any breaks and transitions between BAN modules 450. However, vehicle pads 406 must transition between BAN modules 450, and accordingly, the power transfer between the base pads 415 and the vehicle pads 406 must be maintained through the transitions. In some embodiments of a BAN module 450, the base pads 415 at the ends of the BAN module 450 may be of a different design than the base pads 415 not at the ends of the BAN module 450. In some embodiments, the base pads 415 located at the ends of the BAN modules 450 may be designed so that the total power output from the combined vehicle pads 406 is sufficiently high when at least one of the vehicle pads 406 is transitioning between BAN modules 450. A sufficiently high power output from the combined vehicle pads 406 at a BAN transition may comprise a combined power transfer of 80% of the total power output obtained when not transitioning between BAN modules 450. Alternatively, a sufficiently high power output may comprise a combined power output of 50% or greater. In some embodiments, the end base pads 415 of the BAN module 450 may be designed such that they are of smaller size than the base pads 415 in the middle of the BAN module 450.

The end base pads 415 may be designed to ensure coupling between the end base pads 415 of the BAN modules 450 and the vehicle pads 406 provide similar power transfer as full size base pads 415 of the BAN modules 450. In some embodiments, the design of the end base pads 415 may be based on a distance between full size base pad 415 of twice the base pad pitch, meaning that the distance between the last full size base pad 415 of BAN module 450a and the first full size base pad 415 of BAN module 450b is equal to two full size base pad pitches. Accordingly, to design the end base pads 415 to minimize cross-coupling and other potentially detrimental effects between it and other base pads 415, the end base pads 415 may be impractically small such that they will not had sufficient coupling in comparison to the full size base pads 415.

In some other embodiments, the design of the end base pads 415 may be based on a distance between full size base pad 415 of three times the base pad pitch, meaning that the distance between the last full size base pad 415 of BAN module 450a and the first full size base pad 415 of BAN module 450b is equal to three full size base pad pitches. Here, the end base pads 415 designed to minimize cross-coupling and other potentially detrimental effects on other base pads 415 may be sized and spaced such that they will maintain sufficient coupling in comparison to the full size base pads 415 throughout the transition between BAN modules 450.

In some other embodiments, the design of the end base pads 415 may be based on a distance between full size base pad 415 of four times the base pad pitch, meaning that the distance between the last full size base pad 415 of BAN module 450a and the first full size base pad 415 of BAN module 450b is equal to four full size base pad pitches. Here, the end base pads 415 designed to minimize cross-coupling and other potentially detrimental effects on other base pads 415 may be sized and spaced such that they will have insufficient coupling throughout the BAN module 450 transition, where empty space may exist where the end base pads 415 do not overlap near the transition.

Figure 5:
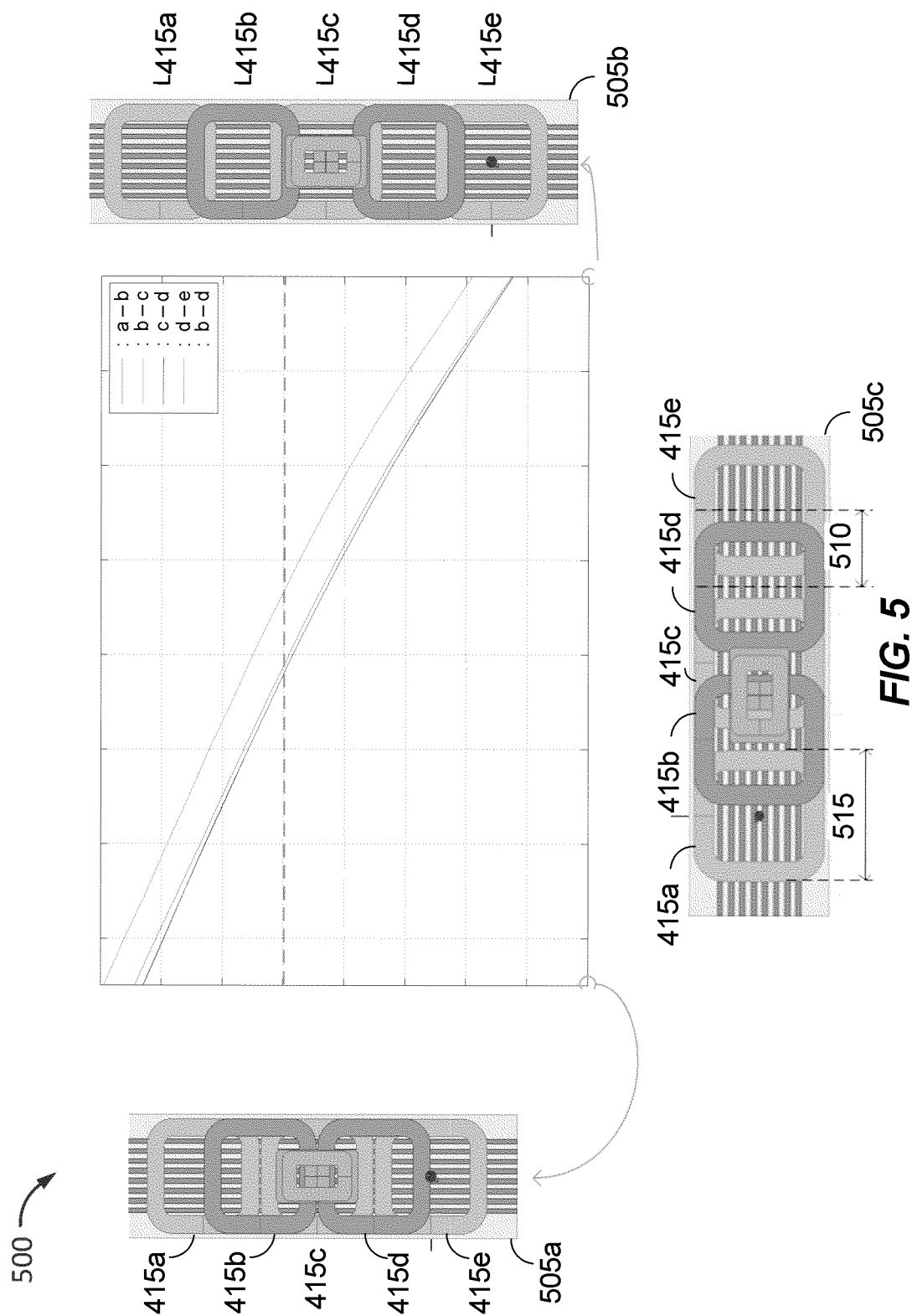
FIG. 5 illustrates a perspective view of three potential layouts for installing base pads in an overlapping manner and a graph of the resulting cross-coupling between neighboring base pads in relation to the pitch between the base pads.

FIG. 5 illustrates a perspective view of three potential layouts for installing base pads 415a-415e in an overlapping manner and a graph of the resulting cross-coupling between neighboring base pads 415 in relation to the pitch between the base pads 415. The depicted layouts are intended to be examples and are not indicative of a preferred installation orientation. Additionally, the manner of overlapping depicted in the layouts is not intended to be indicative of a preferred installation orientation. Optional layout 505a is depicted vertically on the left side of the page. Optional layout 505b is depicted vertically on the right side of the page. Optional layout 505c is depicted horizontally along the bottom of the page. For purposes of simplicity, the direction of travel for the electric vehicle 405 may be from the top of the page to the bottom of the page, and the left of the page to the right of the page.

Each of the optional layouts 505a-505c depicts five base pads 415a-415e and a vehicle pad 406 centered above the layout 505. The base pads 415 shown in each of the layouts may be circular-rectangular/bipolar (CR) base pads. In an alternative embodiment, the base pads 415 may be circular, or rectangular, or elliptical base pads. In some other embodiments, the base pads 415 may be of any shape. In each of the layouts 505a-505c, the base pads 415a-415e overlap neighboring base pads 415. Base pad 415a may be the first base pad 415 in the direction of travel and may overlap base pad 415b. As it is at the end of the layout of the base pads 415, base pad 415a may only overlap with a single other base pad 415. Base pad 415b may be the next base pad 415 in the direction of travel. As discussed above, base pad 415b may overlap with base pad 415a. Additionally, base pad 415b may overlap with base pad 415c, the subsequent base pad 415 in the direction of travel. Base pad 415c may overlap with base pad 415b, as discussed above, and with base pad 415d, the following base pad 415 in the direction of travel. Base pad 415d may overlap with both base pads 415c and 415e. Being the next and final base pad 415 in the direction of travel, base pad 415e may overlap only one other base pad 415. In alternate embodiments, a dynamic wireless charging system 400 may comprise fewer than five base pads 415. In some other embodiments, the dynamic wireless charging system 400 may comprise more than five base pads 415. It is important to note that in each of the optional layouts 505a-505c, the layouts may each depict different pitches between each base pad 415 and different sizes (e.g., length, diameter, etc.) of base pads 415. For example, the pitch between the base pads 415-415e in layout 505a may be smaller than that of optional layouts 505b and 505c. The pitch in layout 505b may be the largest, with the pitch in layout 505c being between that of 505a and 505b.

In the middle of the page is shown a graph 404. The graph 505 shows a range of coil pitch along the x-axis and the cross-coupling between consecutive overlapping base pads 415 along the y-axis. The graph shows the cross-coupling between base pads 415 in relation to the pitch between base pads 415. The graph indicates that the coupling factor decreases linearly as the base pad pitch 417 increases, passing through a zero, and then continuing to generate a negative coupling factor. The graph further depicts the ratio of the coupling factor vs. the base pad pitch 417 for each pair of overlapping base pads (e.g., base pads 415a-415b, 415b-415c, 415c-415d, and 415d-415e). Additionally, the graph shows the ratio of the coupling factor vs base pad pitch 417 of non-overlapping base pads 415b and 415d.

FIG. 5 may serve to depict the correlation between the charging base pad pitch 417 and the resulting coupling factor between consecutive base pads 415 that may be activated at the same time. As indicated by FIG. 5, optional layout 505a may represent base pads 415 in a layout generating a high positive coupling factor between consecutive, overlapping base pads 415 that may be activated concurrently. Similarly, optional layout 505b may represent a layout where the base pads 415 generate a high negative coupling factor between concurrently active, consecutive, overlapping base pads 415. Optional layout 505c may indicate base pads 415 with coupling factors near zero between consecutive, overlapping base pads 415 that are concurrently active. Advantages of activating consecutive, overlapping base pads 415 with minimized a coupling factor may include subsequently minimizing induced voltages and currents between the overlapping pads, which makes the easier to tune and control.

Figure 6A:
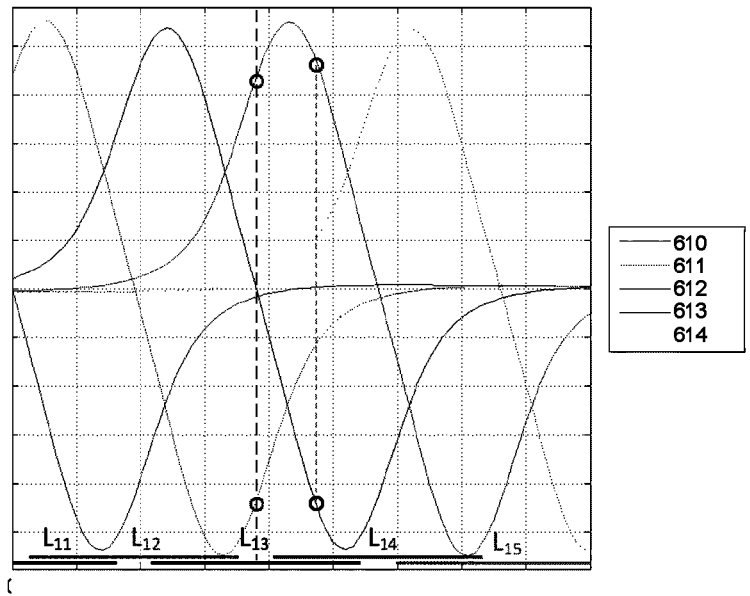
FIG. 6a illustrates a graph of the coupling between each of the base pads and a double-D vehicle pad in relation to the double-D vehicle pad position above the base pads.

FIG. 6a illustrates a graph of the coupling between each of the base pads 415a-415e and a double-D (DD) vehicle pad (not shown in this figure) in relation to a DD vehicle pad position above the base pads 415a-415e. The x-axis may depict the position of the vehicle pad, while the y-axis may depict the resulting coupling between the base pads 415a-415e and the DD vehicle pad. Additionally, the x-axis also indicates an embodiment of the installation locations of the base pads 415a-415e.

FIG. 6a depicts five lines corresponding to the individual coupling between the DD vehicle pad and each of the five base pads 415a-415e as the DD vehicle pad travels over each of the base pads 415a-415e. For example, line 610 represents the coupling between the DD vehicle pad and the base pad 415a, while line 611 may represent the coupling between the DD vehicle pad and the base pad 415b, line 612 the coupling between the DD vehicle pad and the base pad 415c, line 613 the coupling between the DD vehicle pad and the base pad 415d, and line 614 the coupling between the DD vehicle pad and the base pad 415e. As depicted, the coupling between the DD vehicle pad and base pad 415a may vary with the location of the DD vehicle pad above the base pad 415a. When the DD vehicle pad is approximately above the center of the base pad 415a, the coupling between the two pads may be approximately zero. This may be because a DD vehicle pad may be configured to receive horizontal flux generated by an active base pad 415, and the horizontal flux generated by the base pad 415a may be low above the center of the base pad 415. As the DD vehicle pad proceeds above the base pad 415a along the x-axis, the coupling between the DD vehicle pad and the base pad 415a may reach a maximum near the end of the base pad 415a, after which the coupling is shown to approach zero as the vehicle pad passes the end of the base pad 415a and travels away from the base pad 415a. Thus, line 610 indicates that the coupling between the DD vehicle pad and the base pad 415a may be at its greatest above the back edge of the base pad 415. As used herein, the front edge of the base pad 415 may refer to the first edge of the base pad 415 that the vehicle pad 406 may pass over, while the back edge may refer to the second edge that the vehicle pad 406 passes over.

Similarly, line 611 may indicate that the coupling between the DD vehicle pad and the base pad 415b may be greatest above the front edge of the base pad 415b and again above the back edge of the base pad 415b. The line 611 may indicate a coupling of zero above the center of the base pad 415b and may approach zero again as the DD vehicle pad passes the back edge and travels away from the base pad 415b.

Similarly, line 612 may indicate that the coupling between the DD vehicle pad and the base pad 415c may increase as the DD vehicle pad approaches the front edge of the base pad 415c, and may be greatest above the front edge of the base pad 415*c* and again above the back edge of the base pad 415*c*. The line 612 may indicate a coupling of zero above the center of the base pad 415*c* and may approach zero again as the DD vehicle pad passes the back edge and travels away from the base pad 415*c*.

Similarly, line 613 indicates that the coupling between the DD vehicle pad and the base pad 415*d* may increase as the DD vehicle pad approaches the front edge of the base pad 415*d*, and may be greatest above the front edge of the base pad 415*d* and again above the back edge of the base pad 415*d*. The line 613 may indicate a coupling of zero above the center of the base pad 415*c* and may approach zero again as the DD vehicle pad passes the back edge and travels away from the base pad 415*d*.

Finally, line 614 may indicate that the coupling between the DD vehicle pad and the base pad 415*e* may increase as the DD vehicle pad approaches the front edge of the base pad 415*e*, and may be greatest above the front edge of the base pad 415*e* and again above the back edge of the base pad 415*e*. The line 614 may indicate a coupling of zero above the center of the base pad 415*e* and may approach zero again as the DD vehicle pad passes the back edge and travels away from the base pad 415*e*.

As discussed above, FIG. 6*a* may show the coupling between the vehicle pad and the base pad 415 in relation to the vehicle pad position above the respective base pad 415. FIG. 6*a* may show that the horizontal flux, and thus the coupling between the DD vehicle pad and the base pad 415, may be at its maximum when the vehicle pad is directly above the edges of the base pad 415. The horizontal flux may be at its minimum when the vehicle pad is above the center of the base pad 415.

Figure 6B:
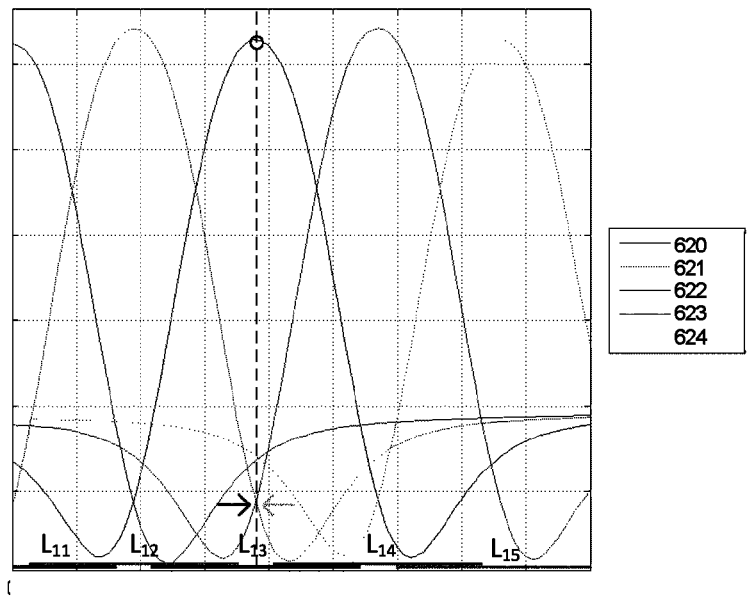
FIG. 6b illustrates a graph of the coupling between each of the base pads and the quadrature vehicle pad in relation to the quadrature vehicle pad position above the base pads.

FIG. 6*b* illustrates a graph of the coupling between each of the base pads 415*a*-415*e* and a Quadrature (Q) vehicle pad (not shown in this figure), in relation to the Q vehicle pad position above the base pads 415*a*-415*e*. In an embodiment, the Q vehicle pad may be installed at the same location as the DD coil discussed in FIG. 6*a* on the electric vehicle 405. In some other embodiment, the Q vehicle pad may be installed at a different location than the DD coil. The x-axis may depict the position of the vehicle pad, while the y-axis may depict the resulting coupling between the base pads 415*a*-415*e* and the Q vehicle pad. Additionally, the x-axis also indicates an embodiment of the installation locations of the base pads 415*a*-415*e*. The locations of the base pad 415*a*-415*e* may be approximately the same as those of FIG. 6*a* and need not be described again.

FIG. 6*b* depicts five lines corresponding to the individual coupling between the Q vehicle pad and each of the five base pads 415*a*-415*e* as the Q vehicle pad travels over each of the base pads 415*a*-415*e*. For example, line 620 represents the coupling between the Q vehicle pad and the base pad 415*a*, while line 621 may represent the coupling between the Q vehicle pad and the base pad 415*b*, line 622 the coupling between the Q vehicle pad and the base pad 415*c*, line 623 the coupling between the Q vehicle pad and the base pad 415*d*, and line 624 the coupling between the Q vehicle pad and the base pad 415*e*.

As depicted, the coupling between the Q vehicle pad and base pad 415*a* may vary with the location of the Q vehicle pad above the base pad 415*a*. When the Q vehicle pad is approximately above the center of the base pad 415*a*, the coupling between the two pads may be near its maximum. This may be because a Q vehicle pad may be configured to receive vertical flux generated by an active base pad 415, and the vertical flux generated by the base pad 415*a* may be high above the center of the base pad 415*a*. As the Q vehicle pad proceeds above the base pad 415*a* along the x-axis, the coupling between the Q vehicle pad and the base pad 415*a* may reach zero above the back edge of the base pad 415*a*, and continue to a negative coupling value after passing beyond the back edge of the base pad 415*a*, after which the coupling again increases and approaches zero. Thus, line 620 indicates that the coupling between the Q vehicle pad and the base pad 415*a* may be at its greatest above the center of the base pad 415*a*.

Similarly, line 621 represents the coupling between the Q vehicle pad and the base pad 415*b*. As depicted, the coupling between the Q vehicle pad and base pad 415*b* varies with the location of the Q vehicle pad above the base pad 415*b*. As the Q vehicle pad approaches the base pad 415*b*, the coupling value may be approaching zero from a negative value. The coupling value will be approximately zero when the Q vehicle pad is approximately above the edge of the base pad 415*b*. From here, the coupling value will continue to rise to a maximum above the center of the base pad 415*b*. As the Q vehicle pad travels above the base pad 415*b* along the x-axis, the coupling between the Q vehicle pad and the base pad 415*b* may approach zero as the vehicle pad approaches the back edge of the base pad 415*b*. After the Q vehicle pad passes the back edge of the base pad 415*b*, the coupling may approach its maximum negative coupling value when the Q vehicle pad is at past the back edge of the base pad 415*b*, after which the coupling value between the Q vehicle pad and base pad 415*b* approaches zero as the Q vehicle pad travels away from the base pad 415*b*.

Similarly, line 622 represents the coupling between the Q vehicle pad and the base pad 415*c*. As depicted, the coupling between the Q vehicle pad and base pad 415*c* varies with the location of the Q vehicle pad above the base pad 415*c*. Line 622 shows that as the Q vehicle pad approaches the base pad 415*c*, coupling between the two pads begins to approach a maximum negative value before the front edge of the base pad 415*c*. As the Q vehicle pad continues to approach the base pad 415*c*, the coupling approaches zero and continues to rise to the maximum above the center of the base pad 415*c*. Then the coupling between the Q vehicle pad and the base pad 415*c* may approach zero as the vehicle pad approaches the back edge of the base pad 415*c*, after which the coupling may again approach its maximum negative coupling value when the Q vehicle pad is past the back edge of the base pad 415*c*, after which the coupling value between the Q vehicle pad and base pad 415*c* approaches zero as the Q vehicle pad travels away from the base pad 415*c*.

Similarly, line 623 represents the coupling between the Q vehicle pad and the base pad 415*d*. As depicted, the coupling between the Q vehicle pad and base pad 415*d* may vary with the location of the Q vehicle pad above the base pad 415*d*. Line 623 shows that as the Q vehicle pad approaches the base pad 415*d*, coupling between the two pads begins to approach a maximum negative value before the front edge of the base pad 415*d*. As the Q vehicle pad continues to approach the base pad 415*d*, the coupling approaches zero and continues to rise to the maximum above the center of the base pad 415*d*. Then the coupling between the Q vehicle pad and the base pad 415*d* may approach zero as the vehicle pad approaches the back edge of the base pad 415*d*, after which the coupling may again approach its maximum negative coupling when the Q vehicle pad is past the back edge of the base pad 415*c*, after which the coupling value between the Q vehicle pad and base pad 415*d* approaches zero as the Q vehicle pad travels away from the base pad 415*d*.

Similarly, line 624 represents the coupling between the Q vehicle pad and the base pad 415*e*. As depicted, the coupling between the Q vehicle pad and base pad 415e may vary with the location of the Q vehicle pad above the base pad 415e. Line 624 shows that as the Q vehicle pad approaches the base pad 415e, coupling between the two pads begins to approach a maximum negative value before the front edge of the base pad 415e. As the Q vehicle pad continues to approach the base pad 415e, the coupling approaches zero and continues to rise to the maximum above the center of the base pad 415e. Then the coupling between the Q vehicle pad and the base pad 415e may approach zero as the vehicle pad approaches the back edge of the base pad 415e, and the coupling may be seen approaching zero but the graph ends.

As discussed above, FIG. 6b may show the coupling between the Q vehicle pad and the base pad 415 in relation to the Q vehicle pad position above the respective base pad 415. FIG. 6b may show that the vertical flux, and thus the coupling between the Q vehicle pad and the base pad 415, may be at its maximum when the vehicle pad is directly above the center of the base pad 415. The vertical flux may be at its minimum when the vehicle pad is above the center of the base pad 415 and when the vehicle pad is beyond the edge of the base pad 415. The vertical flux of the base pad 415 is greatest when not directly above the base pad 415, and accounts for the vertical component of the flux generated by the magnetic field around the base pad 415 coil structure.

Figure 7A:
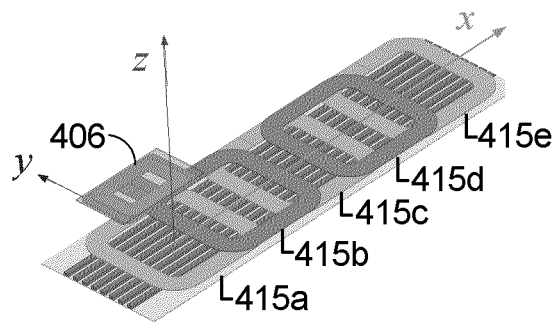
FIG. 7a illustrates a perspective view of an overlapping layout of base pads spaced along the x-axis with the width of the roadway being along the y-axis and a vehicle pad depicted above the base pads along the z-axis.

FIG. 7a illustrates a perspective view of an overlapping layout of base pads 415 spaced along an x-axis in the direction of travel of the roadway 410 with the width of the roadway 410 being along the y-axis and a vehicle pad 406 depicted above the base pads 415 along the z-. The base pads 415a-415e are shown as overlapping. As discussed above, overlapping base pads 415 may result in reduced cross-coupling between the overlapping, consecutive base pads 415 that may be activated at the same time. Cross-coupling (mutual coupling) may occur when the current flow through one base pad 415 affects the current flow through another base pad 415. For example, two base pads 415 installed adjacent to each other that are both activated may cross-couple, wherein their current flows will affect each other. Such cross-coupling can create via loading or reflective inductances and may make the base pad 415 circuit difficult to tune. The pitch-to-pitch spacing of overlapping base pads 415 may determine the amount of cross-coupling experienced. However, as discussed above, if non-overlapping base pads 415 are activated concurrently, a cross-coupling may exist between the two base pads 415 regardless of spacing.

Figure 7B:
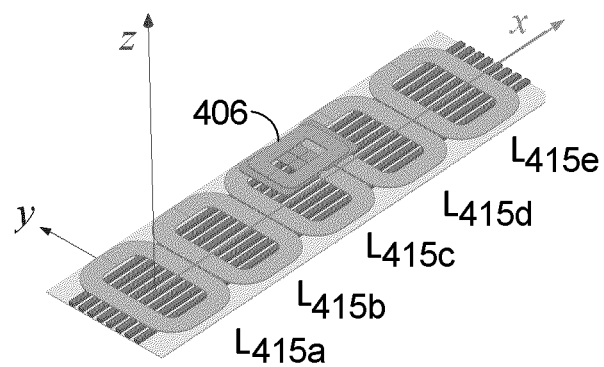
FIG. 7b illustrates a perspective view of a non-overlapping and adjacent layout of base pads spaced along the x-axis with the width of the roadway being along the y-axis and a vehicle pad depicted above the base pads along the z-axis.

FIG. 7b illustrates a perspective view of a non-overlapping and adjacent layout of base pads 415 spaced along the x-axis in the direction of travel of the roadway 410 with the width of the roadway 410 being along the y-axis and a vehicle pad 406 depicted above the base pads 415 along the z-axis. The base pads 415a-415e are shown as being adjacent, wherein each of the base pads 415 may be between two other base pads 415 except for the two base pads 415 at the end of the dynamic wireless charging system 400, which each neighbor only one other base pad 415. The pitch-to-pitch spacing of adjacent base pads 415 may determine the amount of cross-coupling experienced. However, as discussed above, if non-overlapping base pads 415 are activated concurrently, a cross-coupling may exist between the two base pads 415 regardless of spacing.

With regards to both FIGS. 7a and 7b, as the electric vehicle 405 travels along the roadway 410, the vehicle pad 406 may couple with each of the base pads 415a-415e successively in the electric vehicle 405 direction of travel. As the vehicle pad 406 couples with each of the base pads 415, power may be transferred from the base pads 415a-415e to the vehicle pad 406 for use by the electric vehicle 405, as discussed above. As will be discussed in more detail below, the vehicle pad 406 may comprise at least one of a double-D (DD) vehicle pad or a quadrature (Q) vehicle pad. A DD vehicle pad may be utilized in situations where horizontal flux is targeted to be absorbed, while a Q vehicle pad may be utilized when a vertical flux is targeted.

Each of FIGS. 8-16 depicts similar elements: a chart, base pad layouts indicating sequence steps (each base pad layout being the same but with different combinations of active base pads 415), and a graph depicting a coupling curve as the electric vehicle 405 and vehicle pad 406 travel above the base pads 415. The chart is along the left side of the page and may have a row corresponding to each base pads layout (each row may correspond to the charging base layout to the right of the row) and a column corresponding to each base pad 415 depicted in the base pads layout. The data contained in the chart may represent a state and current flow direction of a base pad 415 in a particular base pad layout. A value of "0" may indicate the base pad 415 is off, while a value of "1" may indicate that the base pad 415 in active with a current flow in the counterclockwise direction, and a value of "−1" may indicate that the base pad 415 is active with a current flow in the clockwise direction. Thus, a "1" in row 2 (from the top), column 1 (from the right) of the chart may indicate that the base pad 415a in the second layout from the top is active with a current flow in the counterclockwise direction.

In some embodiments, the direction, magnitude, and/or the phase of the current flow through the connected base pad 415 may be set according to the pre-set sequences and may not be individually controlled or adjusted for a single base pad 415. In other embodiments, the direction, magnitude, and/or the phase of the current flow through the connected base pad 415 may be adjustable between at least three states, forward (clockwise through the base pad), backward (counterclockwise through the base pad), and off, dependent upon the determination of the local controller 425 or the distribution controller 445. The ability to control the direction, the magnitude, and/or the phase of the current flow through the base pads 415 may be necessary to control the wireless power transfer between the base pads 415 and the vehicle pads 406. In some embodiments, as will be discussed below, various combinations of current flow direction, magnitude, and phase may result in varied power transfers which may be desired according to the parameters of the electric vehicle 405 to be wirelessly charged by the system.

Additionally, the base pad layouts may depict a box encompassing a combination of base pads 415, indicating what combination of base pads 415 are activated, and an arrow on active base pads 415 indicating the direction of current flow in the base pads 415. The graph may contain various lines that may correspond to the coupling of the vehicle pad 406 and the active base pads 415 indicated in the associated base pad layouts. On the x-axis of the graph is shown position, while the y-axis shows the current used by the base pad 415 to generate a determined power at the vehicle pad 406. The graph also depicts the location of the base pads 415a-415e along the bottom of the graph above the x-axis.

Each of the FIGS. 8-12 may indicate a layout and sequence by which the base pads 415 in a dynamic wireless charging system 400 may be controlled and activated while an electric vehicle 405 travels above them in a direction of travel so as to provide for the most efficient and smooth power transfer across multiple base pads 415. The various layouts, charts, and graphs depicted through the series of FIGS. 8-12 may indicate that the sequence in which base pads 415 are activated and the orientation of the current flows in the base pads 415 may significantly impact the transfer of power between the base pads 415 and the vehicle pad. The various layouts and charts depict different combinations and sequences of active base pads 415 and direction of current flow through each of the active base pads 415.

The sequences below may be a combination of individual steps (e.g., 906-909) wherein various combinations of base pads 415 may be activated so as to provide effective and efficient transfer of power by only activating the base pads 415 capable of efficient power transfer to the vehicle pads 406 at a given moment. The individual steps may correlate to different times and or positions and the sequence may iterate between the steps based on time elapsed or vehicle position or other vehicle detection methods. In one embodiment, the sequence and/or steps of the sequence may be controlled by one of the distribution controller 445 and the local controller 425 and the electric vehicle 405. For example, the distribution controller 445 or the local controller 425 may communicate with the electric vehicle 405 having vehicle pads 406 and may determine the direction and speed of the electric vehicle 405. Using information communicated, the distribution controller 445 or the local controller 425 or electric vehicle 405 may activate a predetermined sequence or develop a new sequence based upon parameters. These parameters may at least one of at least: the number of vehicle pads 406, the vehicle pad pitch 705, the speed of the vehicle, the direction of the vehicle, the present charge of the vehicle, the current load of the vehicle, or the current demand of the vehicle. The distribution controller 445 or the local controller 425 or the electric vehicle 405 may develop a sequence customized to the requirements and parameters of the electric vehicle 405, and may iterate through the sequence based upon the parameters of the electric vehicle 405. In another embodiment, the distribution controller 445 or the local controller 425 or the electric vehicle may select one of a plurality predetermined sequences and iterate through the sequence based upon the parameters of the electric vehicle 405.

Figure 8:
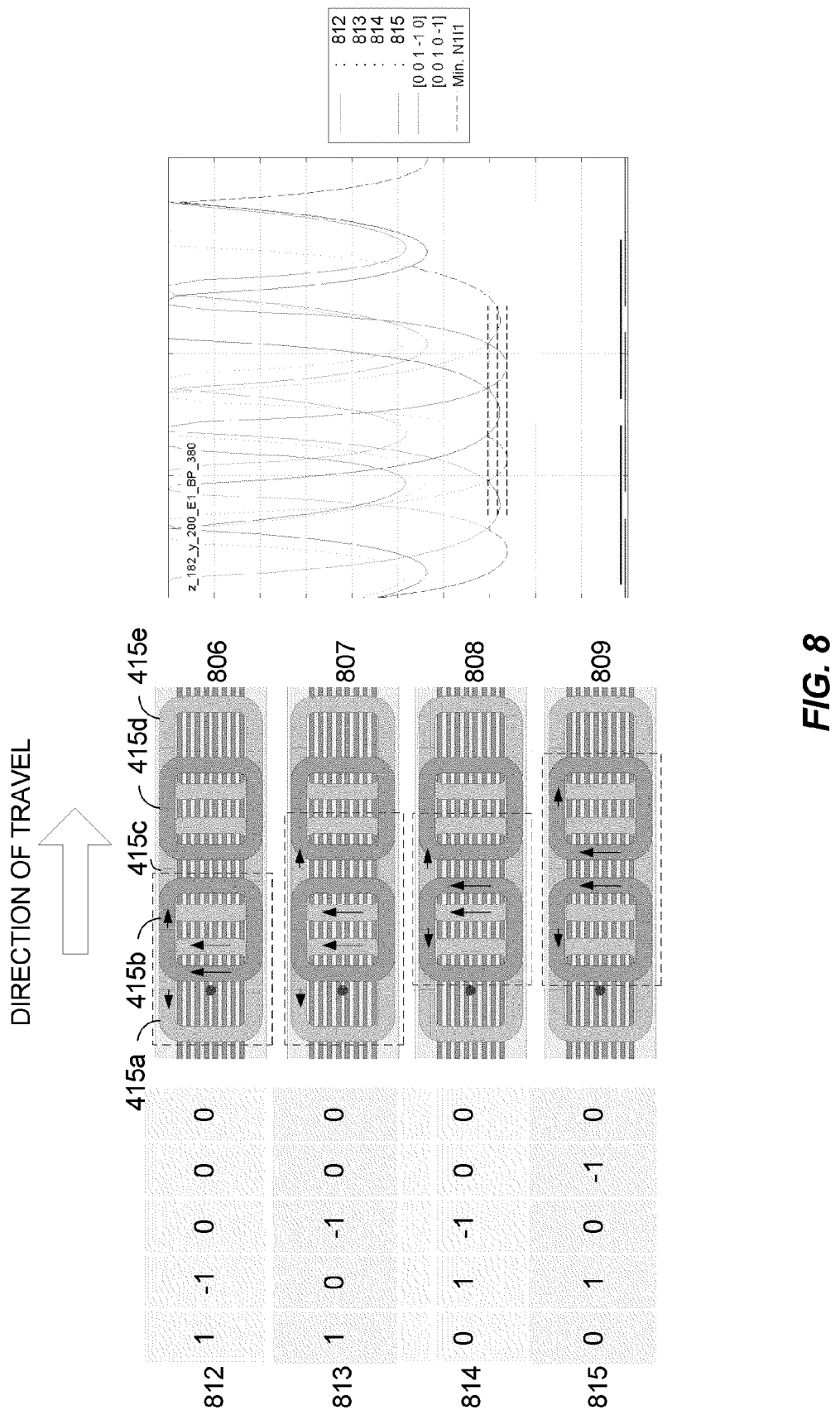
FIG. 8 illustrates an embodiment of a sequence for activating overlapping base pads in a non-consecutive manner with reversing current flows and with a double-D vehicle pad.

FIG. 8 illustrates an embodiment of a sequence 800 for activating overlapping base pads 415 in a non-consecutive manner (e.g., where each base pad 415 is not activated one after the other consecutively in the direction of travel) with reversing current flows (e.g., where the current flow direction through a base pad 415 may be reversed at different times of activation, dependent upon the combination of other base pads 415 with which it is activated) with a DD vehicle pad. While the steps 806-809 of sequence 800 only show two base pads 415 active at any given moment, other embodiments may have any number of base pads 415 active at a given moment. The steps 806-809 comprise the overlapping base pad layout of FIG. 7a. Each of steps 806-809 comprise five base pads 415a-415e, arranged sequentially in the direction of travel. Each of the steps 806-809 represents a single stage or step in the activation sequence and indicates what combination of base pads 415 may be active at that step and in what direction the current may flow through each of the active base pads 415. For example, step 806 may represent the first step in the sequence 800 depicted by FIG. 8. During this step 806, base pad 415a may be active with a counterclockwise current flow and base pad 415b may be active with a clockwise current flow. Accordingly, step 807 may represent the second step in the sequence 800, 808 the third, and 809 the fourth. In step 807, the second step, base pad 415a will again be active with a counterclockwise current flow and base pad 415c will be active with a clockwise current flow. Step 808 shows base pads 415b and 415c being active with counterclockwise and clockwise current flows, respectively, while the fourth step 809 shows base pads 415b and 415d active, 415b having a counterclockwise current flow and 415d having a clockwise current flow. In some embodiments, additional steps may be included in the entire sequence 800. In other embodiments, fewer steps may be included in the sequence 800 represented by FIG. 8. The number of steps/stages shown in FIG. 8 is intended to be an example and not intended to be limiting.

The chart 803 on the left side of FIG. 8 comprises four rows 811-815, wherein each row may correspond to the steps 806-809 of the sequence 800, and five columns, each column corresponding to one of the base pads 415. The information depicted in the chart corresponds to the discussion above regarding steps 806-809 and the combination of active base pads 415 and current flow directions. The graph indicating the current used by the base pads 415 to generate a power at the vehicle pad 406 for each depicted step 806-809 of sequence 800.

The use of a DD vehicle pad in combination with overlapping base pads 415 and a non-sequential activation sequence with reversing current flow directions results in a power transfer that fluctuates a small amount (the least fluctuation of each of the graphs in FIG. 9-12). Additionally, the average current required to generate the power at the vehicle pad is lower than that of a majority of the combinations of layouts and activation sequences in FIGS. 9-12, and this efficient and smooth of a transfer is accomplished using only a DD vehicle pad. Utilizing only a DD vehicle pad may be beneficial by minimizing the costs of the system, and reducing a vehicle pad by not using the Q vehicle pad may be beneficial. However, this layout and activation sequence 800 may result in cross coupling problems (caused by activating non-sequential base pads 415) and the reversing of current flow direction requires additional complexity in one of the base pads 415, the switch 420, or the local controller 425. As discussed above, activating combinations of base pads 415 that have cross coupling may create via loading and reflective inductances and may make the base pads 415 and the systems more difficult to tune.

Figure 9:
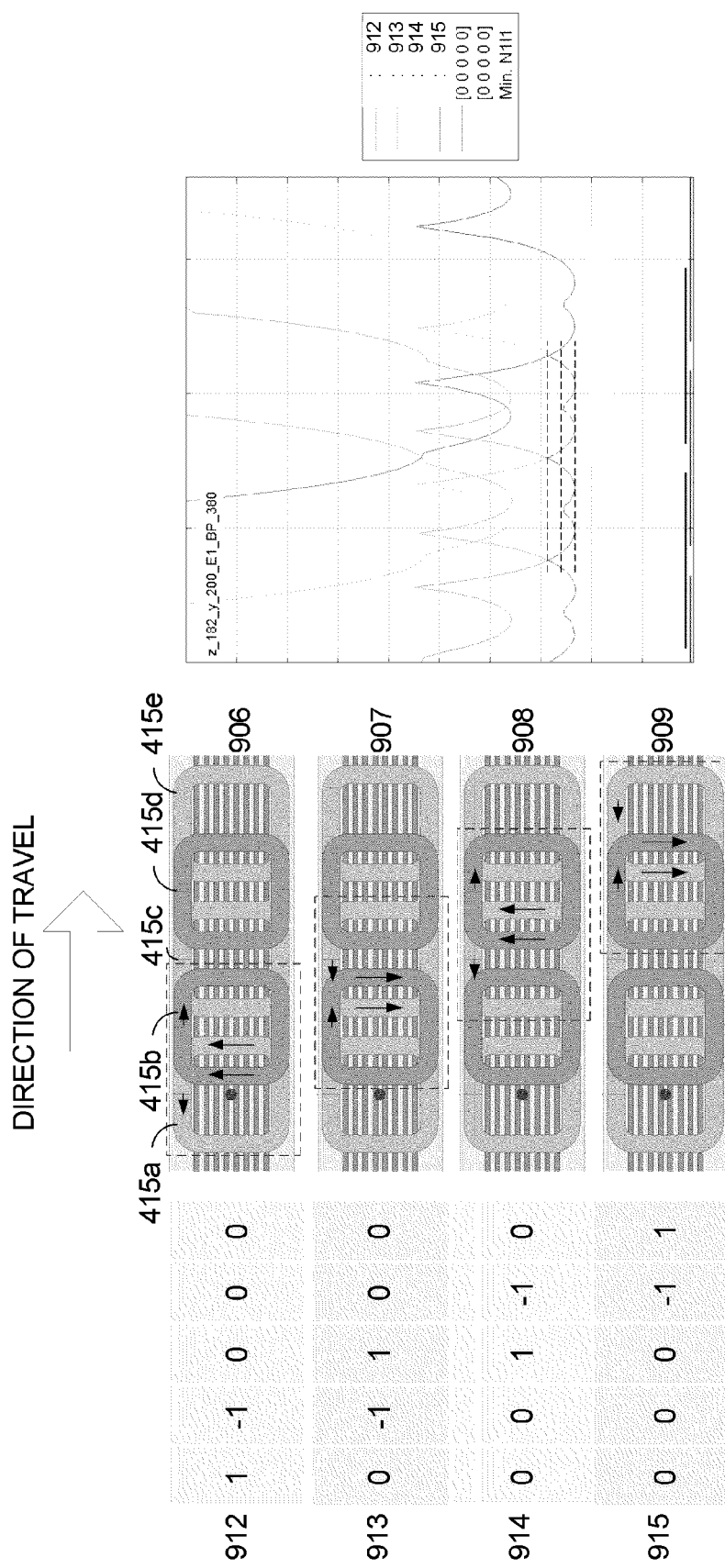
FIG. 9 illustrates an embodiment of a sequence for activating overlapping base pads in a consecutive manner with no reversing current flows and with a double-D-quadrature vehicle pad.

FIG. 9 illustrates an embodiment of a sequence 900 for activating overlapping base pads 415 in a consecutive manner (e.g., where each base pad 415 is activated in combination with an adjacent base pad 415) with no reversing current flows (e.g., the base pads 415 are either on or off without need for controlling the current flow direction) with a DDQ vehicle pad. While the steps 906-909 only show two base pads 415 active at any given moment, other embodiments may have any number of base pads 415 active at a given moment. The steps 906-909 comprise the overlapping base pad layout of FIG. 7a. The steps 906-909 comprise five base pads 415a-415e, arranged sequentially in the direction of travel. Each of the steps 906-909 represents a single stage or step in the activation sequence 900 and indicates what combination of base pads 415 may be active at that step and in what direction the current may flow through each of the active base pads 415. For example, step 906 may represent the first step in the sequence 900 depicted by FIG. 9. During this step, base pad 415a may be active with a counterclockwise current flow and base pad 415b may be active with a clockwise current flow. Accordingly, step 907 may represent the second step in the sequence 900, 908 the third, and 909 the fourth. In step 907, the second step, base pad 415b may again be active with a clockwise current flow and base pad 415c will be active with a counterclockwise current flow. Step 908 shows base pads 415c and 415d being active with counterclockwise and clockwise current flows, respectively, while the fourth step 909 shows base pads 415d and 415e being active, 415d having a clockwise current flow and 415e having a counterclockwise current flow. In some embodiments, additional steps may be included in the entire sequence. In other embodiments, fewer steps may be included in the sequence 900 represented by FIG. 9. The number of steps/stages shown in FIG. 9 is intended to be an example and not intended to be limiting.

The chart on the left side of FIG. 9 comprises four rows 911-915, wherein each row may correspond to the step 906-909 of the sequence 900, and five columns, each column corresponding to one of the base pads 415. The information depicted in the chart corresponds to the discussion above regarding steps 906-909 and the combination of active base pads 415 and current flow directions. The graph indicating the current used by the base pads 415 to generate a power at the vehicle pad 406 for each depicted step 906-909.

The use of both DD and Q vehicle pads with overlapping base pads 415 and a sequential activation sequence 900 with non-reversing current flows results in power transfers that fluctuate very little (just slightly more fluctuation than the setup of FIG. 8). Additionally, the average current draw is the lowest of all the combinations of layouts and activation sequences in FIGS. 8-12. However, this efficient and smooth of a transfer may require both DD and Q vehicle pads. Utilizing a DDQ vehicle pad may add cost to the system by requiring the electric vehicle 405 to have additional components (both a DD coil AND a Q coil). However, this layout and activation sequence 900 may reduce cross coupling problems (because no combination of non-sequential base pads 415 is activated concurrently) and the base pads 415 are only turned on or off without requiring the ability to reverse current flow directions. This helps reduce the complexity in the system components (one of the base pads 415, the switch 420, or the local controller 425, where the current flow direction within a specific base pad 415 does not change according to a sequence step). Further, as discussed above, since no combinations of base pads 415 activated create cross coupling, the system may become less difficult to tune and via loading and reflective inductances may be less of a concern.

Figure 10:
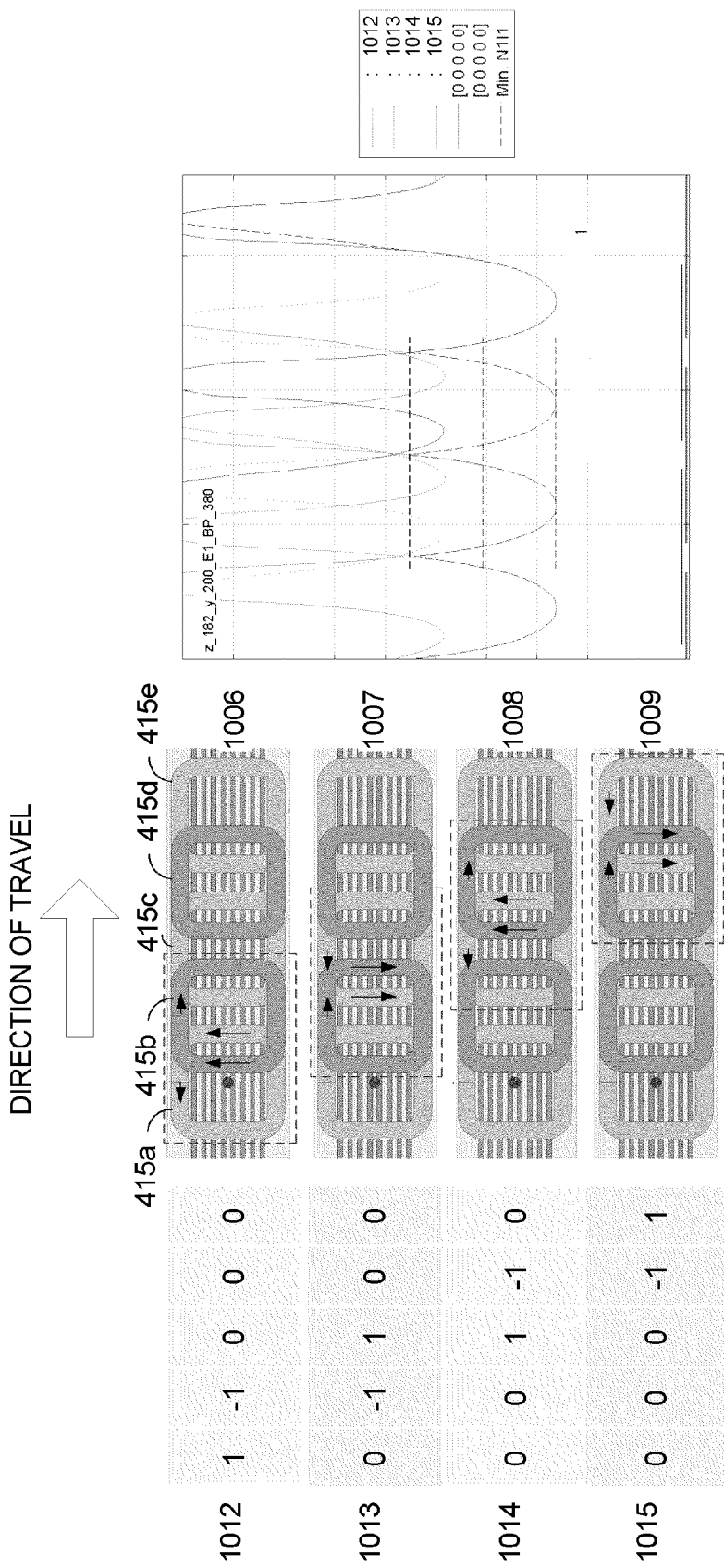
FIG. 10 illustrates an embodiment of a sequence for activating overlapping base pads in a consecutive manner with no reversing current flows and with a double-D vehicle pad.

FIG. 10 illustrates an embodiment of a sequence 1000 for activating overlapping base pads 415 in a consecutive manner (e.g., where each base pad 415 is activated in combination with an adjacent base pad 415) with no reversing current flows (e.g., the base pads 415 are either on or off without need for controlling the current flow direction) with a DD vehicle pad. While the steps 1006-1009 of sequence 1000 only show two base pads 415 active at any given moment, other embodiments may have any number of base pads 415 active at a given moment. The base pad steps 1006-1009 comprise the overlapping base pad layout of FIG. 7a. The steps 1006-1009 comprise five base pads 415a-415e, arranged sequentially in the direction of travel. Each of the steps 1006-1009 represents a single stage or step in the activation sequence and indicates what combination of base pads 415 will be active at that step and in what direction the current may flow through each of the active base pads 415. For example, step 1006 may represent the first step in the sequence depicted by FIG. 10. During this step, base pad 415a may be active with a counterclockwise current flow and base pad 415b may be active with a clockwise current flow. Accordingly, step 1007 may represent the second step in the sequence 1000, 1008 the third, and 1009 the fourth. In step 1007, the second step, base pad 415b may again be active with a clockwise current flow and base pad 415c will be active with a counterclockwise current flow. Step 1008 shows base pads 415c and 415d being active with counterclockwise and clockwise current flows, respectively, while the fourth step 1009 shows base pads 415d and 415e being active, 415d having a clockwise current flow and 415e having a counterclockwise current flow. In some embodiments, additional steps may be included in the entire sequence 1000. In other embodiments, fewer steps may be included in the sequence represented by FIG. 10. The number of steps/stages shown in FIG. 10 is intended to be an example and not intended to be limiting.

The chart on the left side of FIG. 10 comprises four rows 1011-1015, wherein each row may correspond to a step 1006-1009 of the sequence 1000, and five columns, each column corresponding to one of the base pads 415. The information depicted in the chart corresponds to the discussion above regarding steps 1006-1009 and the combination of active base pads 415 and current flow directions. The graph indicates the current used by the base pads 415 to generate power at the vehicle pad 406 for each depicted step 1006-1009.

The use of only a DD vehicle pad with overlapping base pads 415 and a sequential activation sequence with non-reversing current flows results in current loads that fluctuate nearly five times more than the combinations of FIGS. 8 and 9. The primary difference between this combination and the combination of FIG. 9 is the lack of a Q vehicle pad in this combination. The average current load is the highest of all the combinations of layouts and activation sequences in FIGS. 8-12. Additionally, the current fluctuations is not very smooth. Thus, while utilizing only a DD vehicle pad may be beneficial by minimizing the costs of the system, and reducing a cost of a vehicle pad by not using the Q vehicle pad is beneficial, with this layout and activation sequence 1000, removing the Q vehicle pad greatly may be seen to reduce the efficiency of the system. However, with this combination of active base pads 415, cross coupling is less of a concern (no combination of non-sequential base pads 415 are activated concurrently) and the base pads 415 are only turned on or off without requiring the ability to reverse current flow directions, reducing the complexity of system components (one of the base pads 415, the switch 420, or the local controller 425). Further, as discussed above, since no combinations of base pads 415 activated (only mutually decoupled coils are active), the system may be less difficult to tune and via loading and reflective inductances may be less of a concern.

Figure 11:
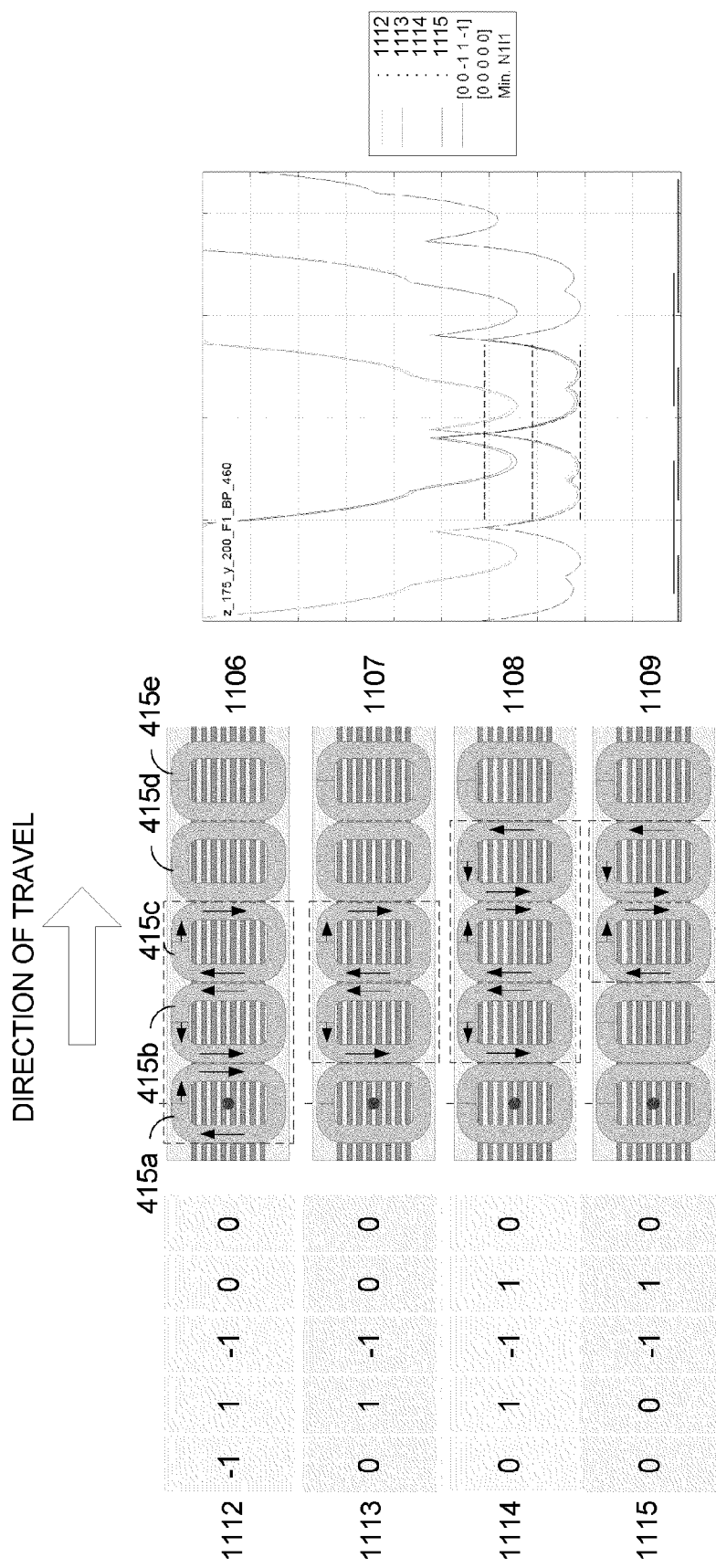
FIG. 11 illustrates an embodiment of a sequence for activating non-overlapping base pads in a non-consecutive manner with no reversing current flows and with a double-D-quadrature vehicle pad.

FIG. 11 illustrates an embodiment of a sequence 1100 for activating non-overlapping base pads 415 in a consecutive manner (e.g., where each base pad 415 is activated in combination with adjacent base pads 415) with no reversing current flows (e.g., the base pads 415 are either on or off without need for controlling the current flow direction) with a DDQ vehicle pad. While the steps 1106-1109 show either two or three base pads 415 active at any given moment, other embodiments may have any number of base pads 415 active at a given moment. The steps 1106-1109 of sequence 1100 comprise the non-overlapping base pad layout of FIG. 7b. The steps 1106-1109 comprise five base pads 415a-415e, arranged sequentially in the direction of travel. Each of the steps 1106-1109 represents a single stage or step in the activation sequence and indicates what combination of base pads 415 will be active at that step and in what direction the current may flow through each of the active base pads 415. For example, step 1106 may represent the first step in the sequence 1100 depicted by FIG. 11. During this step, base pad 415a may be active with a clockwise current flow, base pad 415b may be active with a counterclockwise current flow, and base pad 415c may be active with a clockwise current flow. Accordingly, step 1107 may represent the second step in the sequence 1100, 1108 the third, and 1109 the fourth. In step 1107, the second step, base pad 415b may again be active with a counterclockwise current flow and base pad 415c will be active with a clockwise current flow. Step 1108 shows base pads 415b, 415c, and 415d being active with counterclockwise, clockwise, and counterclockwise current flows, respectively. The fourth step 1109 shows base pads 415c and 415d being active, 415c having a clockwise current flow and 415d having a counterclockwise current flow. In some embodiments, additional steps may be included in the entire sequence 1100. In other embodiments, fewer steps may be included in the sequence represented by FIG. 11. The number of steps/stages shown in FIG. 11 is intended to be an example and not intended to be limiting.

The chart on the left side of FIG. 11 comprises four rows 1111-1114, wherein each row may correspond to a step 1106-1109 of the sequence 1100, and five columns, each column corresponding to one of the base pads 415. The information depicted in the chart corresponds to the discussion above regarding steps 1106-1109 and the combination of active base pads 415 and current flow directions. The graph indicating the current used by the base pads 415 to generate a power at the vehicle pad 406 for each depicted step.

The use of a DDQ vehicle pad in combination with non-overlapping base pads 415 utilizing an activation sequence 1100 wherein two or three base pads 415 are activated per step in a sequential manner and with constant current flow direction results in a less smooth power transfer than the combination depicted in FIG. 8 and FIG. 9 that is also less efficient than FIGS. 8 and 9. The primary difference between this combination and the combination of FIGS. 8 and 9 is the layout of the base pads 415. The average current load is higher than that of the combinations of layouts and activation sequences in FIGS. 8 and 9, lower than that of 10, and about the same as that of 12. Additionally, the current fluctuations are somewhat smooth, having portions of low fluctuation, separated by spikes of current load. Thus, the utilization of both a DD vehicle pad and a Q vehicle pad may not be very beneficial in producing efficient, smooth power transfers and may not minimize the costs of the system by requiring both pads. Additionally, with this layout of base pads 415, cross coupling is a concern, as discussed above, because a larger pitch between base pads 415 may lead to larger cross coupling, which may make the system more difficult to tune and via loading and reflective inductances may be of a greater concern. Furthermore, activating a third base pad 415 in certain steps does not seem beneficial, as seen from comparing the results to FIG. 12, while requiring additional power. However, there is a benefit in the base pads 415 only being turned on or off without requiring the ability to reverse current flow directions, reducing the complexity of system components (one of the base pads 415, the switch 420, or the local controller 425).

Figure 12:
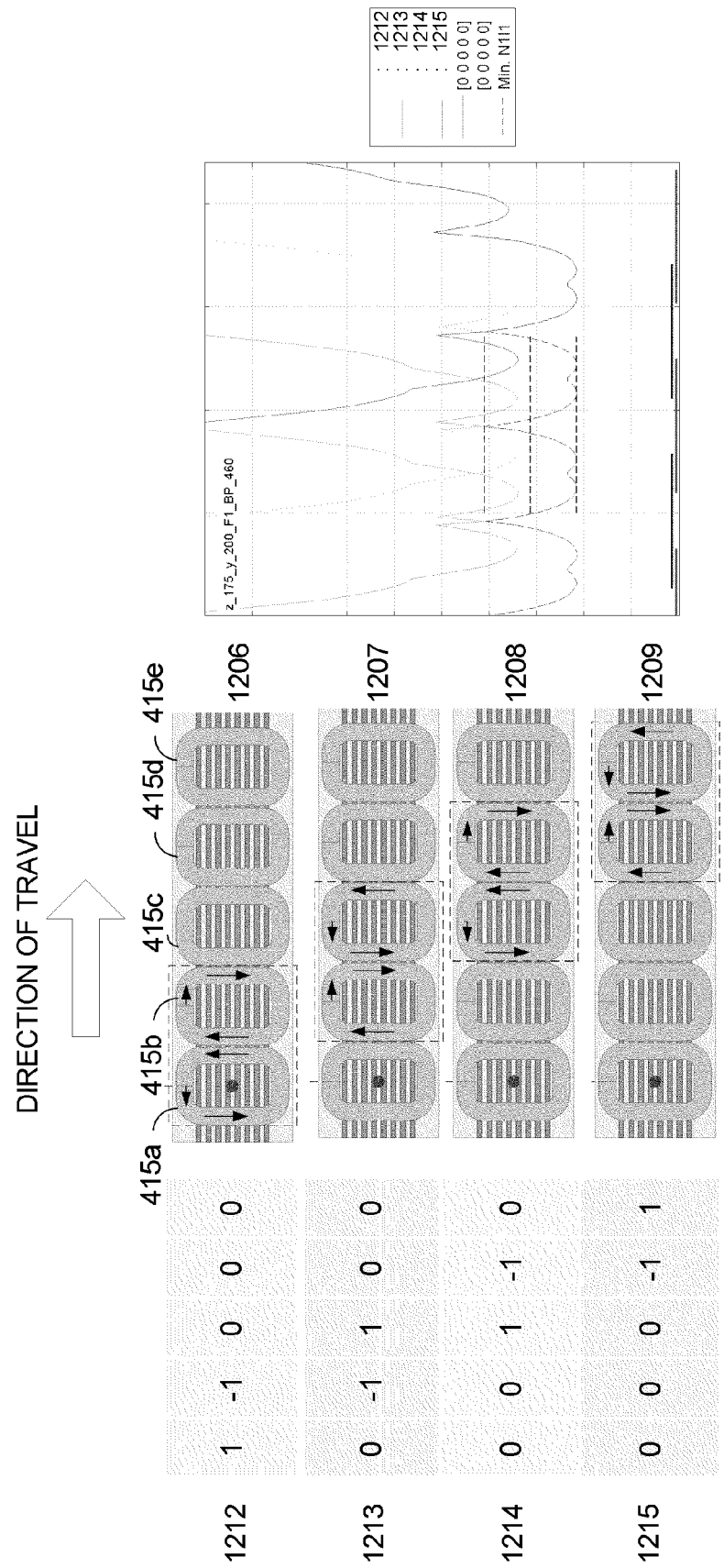
FIG. 12 illustrates an embodiment of a sequence for activating non-overlapping base pads in a consecutive manner with no reversing current flows and with a double-D-quadrature vehicle pad.

FIG. 12 illustrates an embodiment of a sequence 1200 for activating non-overlapping base pads 415 in a consecutive manner (e.g., where each base pad 415 is activated in combination with an adjacent base pad 415) with no reversing current flows (e.g., the base pads 415 are either on or off without need for controlling the current flow direction) with a DDQ vehicle pad. While the steps 1206-1209 only show two base pads 415 active at any given moment, other embodiments may have any number of base pads 415 active at a given moment. The steps 1206-1209 of sequence 1200 comprise the overlapping base pad layout of FIG. 7b. The steps 1206-1209 comprise five base pads 415a-415e, arranged sequentially in the direction of travel. Each of the steps 1206-1209 represents a single stage or step in the activation sequence and indicates what combination of base pads 415 will be active at that step and in what direction the current may flow through each of the active base pads 415. For example, step 1206 may represent the first step in the sequence 1200 depicted by FIG. 12. During this step, base pad 415a may be active with a counterclockwise current flow and base pad 415b may be active with a clockwise current flow. Accordingly, step 1207 may represent the second step in the sequence, 1208 the third, and 1209 the fourth. In step 1207, the second step, base pad 415b may again be active with a clockwise current flow and base pad 415c will be active with a counterclockwise current flow. Step 1208 shows base pads 415c and 415d being active with counterclockwise and clockwise current flows, respectively, while the fourth step 1209 shows base pads 415d and 415e being active, 415d having a clockwise current flow and 415e having a counterclockwise current flow. In some embodiments, additional steps may be included in the entire sequence 1200. In other embodiments, fewer steps may be included in the sequence represented by FIG. 12. The number of steps/stages shown in FIG. 12 is intended to be an example and not intended to be limiting.

The chart on the left side of FIG. 12 comprises four rows 1211-1214, wherein each row may correspond to a step 1206-1209 of the sequence 1200, and five columns, each column corresponding to the base pads 415. The information depicted in the chart corresponds to the discussion above regarding steps 1206-1209 and the combination of active base pads 415 and current flow directions. The graph indicating the current used by the base pads 415 to generate a power at the vehicle pad 406 for each depicted step.

The use of a DDQ vehicle pad in combination with non-overlapping base pads 415 utilizing an activation sequence 1100 wherein two base pads 415 are activated per step in a sequential manner and with constant current flow direction results in a less smooth power transfer than the combination depicted in FIG. 8 and FIG. 9 (though better than FIG. 10 and the same as FIG. 11) that is also less efficient than FIGS. 8 and 9, though better than FIG. 10 and the same as FIG. 11. The primary difference between this combination and the combination of FIGS. 8 and 9 is the layout of the base pads 415. The average current load is higher than that of the combinations of layouts and activation sequences in FIGS. 8 and 9, lower than that of 10, and about the same as that of 11. Additionally, the current fluctuations are somewhat smooth, having portions of low fluctuation, separated by spikes of current load. Thus, the utilization of both a DD vehicle pad and a Q vehicle pad may not be very beneficial in producing efficient, smooth power transfers and may not minimize the costs of the system by requiring both pads. Additionally, with this layout of adjacent base pads 415, cross coupling is a concern, as discussed above, because a larger pitch between base pads 415 may lead to larger cross coupling, which may make the system more difficult to tune and via loading and reflective inductances may be of a greater concern. However, there is a benefit in the base pads 415 only being turned on or off without requiring the ability to reverse current flow directions, reducing the complexity of system components (one of the base pads 415, the switch 420, or the local controller 425).

Figure 13:
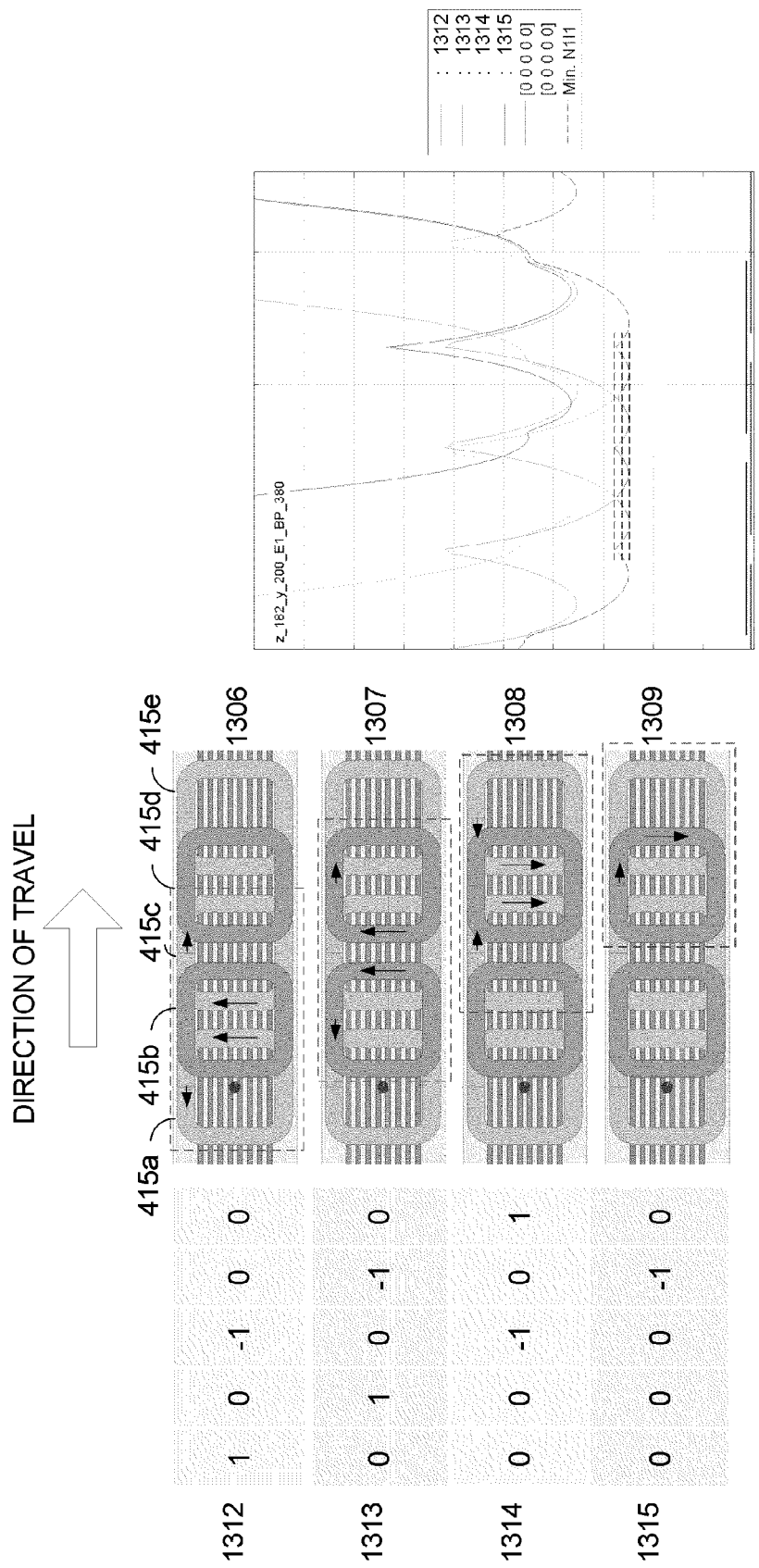
FIG. 13 illustrates an embodiment of a sequence for activating overlapping base pads in a non-consecutive manner with no reversing current flows and with a double-D-quadrature vehicle pad.

FIG. 13 illustrates an embodiment of a sequence 1300 for activating overlapping base pads 415 in a non-consecutive manner (e.g., where each base pad 415 is not activated one after the other consecutively in the direction of travel) with non-reversing current flows (e.g., where the current flow direction through a base pad 415 remains constant at different times of activation, regardless of the combination of other base pads 415 with which it is activated) with a DDQ vehicle pad. While the steps 1306-1309 of sequence 1300 only show two base pads 415 active at any given moment, other embodiments may have any number of base pads 415 active at a given moment. The steps 1306-1309 comprise the overlapping base pad layout of FIG. 7a. Each of steps 1306-1309 comprise five base pads 415a-415e, arranged sequentially in the direction of travel. Each of the steps 1306-1309 represents a single stage or step in the activation sequence and indicates what combination of base pads 415 may be active at that step and in what direction the current may flow through each of the active base pads 415. For example, step 1306 may represent the first step in the sequence 1300 depicted by FIG. 13. During this step 1306, base pad 415a may be active with a counterclockwise current flow and base pad 415c may be active with a clockwise current flow. Accordingly, step 1307 may represent the second step in the sequence 1300, 1308 the third, and 1309 the fourth. In step 1307, the second step, base pad 415b will again be active with a counterclockwise current flow and base pad 415d will be active with a clockwise current flow. Step 1308 shows base pads 415c and 415e being active with clockwise and counterclockwise current flows, respectively, while the fourth step 1309 shows base pad 415d active, 415d having a clockwise current flow. In some embodiments, additional steps may be included in the entire sequence 1300. In other embodiments, fewer steps may be included in the sequence 1300 represented by FIG. 13. The number of steps/stages shown in FIG. 13 is intended to be an example and not intended to be limiting.

The chart 1303 on the left side of FIG. 13 comprises four rows 1311-1314, wherein each row may correspond to the steps 1306-1309 of the sequence 1300, and five columns, each column corresponding to one of the base pads 415. The information depicted in the chart corresponds to the discussion above regarding steps 1306-1309 and the combination of active base pads 415 and current flow directions. The graph indicating the current used by the base pads 415 to generate a power at the vehicle pad 406 for each depicted step 1306-1309 of sequence 1300.

The use of a DDQ vehicle pad in combination with overlapping base pads 415 and a non-sequential activation sequence with reversing current flow directions results in a power transfer that fluctuates a small amount (the least fluctuation of each of the graphs in FIG. 8-16). Additionally, the average current required to generate the power at the vehicle pad 406 is lower than that of all but one (FIG. 14) of the combinations of layouts and activation sequences in FIGS. 8-16, and this transfer occurs while only activating two base pads 415 at once and maintaining constant current flow directions (i.e., the current flow through each base pad 415 is always the same throughout the various sequence 1300 steps). However, this efficient and smooth of a transfer is accomplished using a DDQ vehicle pad and utilizing a DDQ vehicle pad may increase the costs of the system by requiring two types of vehicle pads 406. Additionally, this layout and activation sequence 1300 may result in cross coupling problems (caused by activating non-sequential base pads 415). As discussed above, activating combinations of base pads 415 that have cross coupling may create via loading and reflective inductances and may make the base pads 415 and the systems more difficult to tune.

Figure 14:
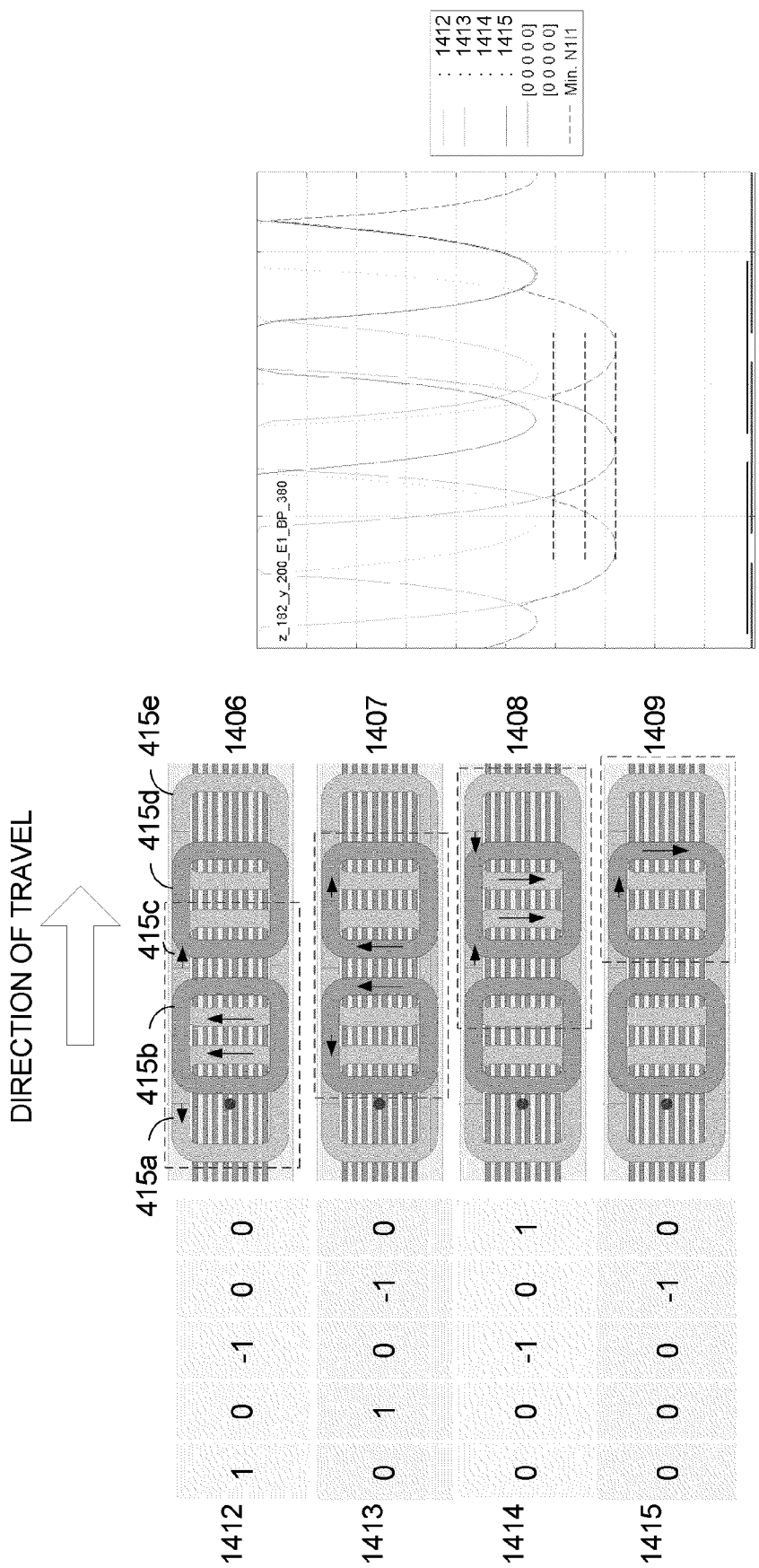
FIG. 14 illustrates an embodiment of a sequence for activating a pair of overlapping base pads in a non-consecutive manner with non-reversing current flows and with a double-D vehicle pad.

FIG. 14 illustrates an embodiment of a sequence 1400 for activating a pair of overlapping base pads 415 in a non-consecutive manner (e.g., where each base pad 415 is not activated one after the other consecutively in the direction of travel) with non-reversing current flows (e.g., where the current flow direction through a base pad 415 remains constant at different times of activation, regardless of the combination of other base pads 415 with which it is activated) with a DD vehicle pad. While the steps 1406-1409 of sequence 1400 only show two base pads 415 active at any given moment, other embodiments may have any number of base pads 415 active at a given moment. The steps 1406-1409 comprise the overlapping base pad layout of FIG. 7a. Each of steps 1406-1409 comprise five base pads 415a-415e, arranged sequentially in the direction of travel. Each of the steps 1406-1409 represents a single stage or step in the activation sequence and indicates what combination of base pads 415 may be active at that step and in what direction the current may flow through each of the active base pads 415. For example, step 1406 may represent the first step in the sequence 1400 depicted by FIG. 14. During this step 1406, base pad 415a may be active with a counterclockwise current flow and base pad 415c may be active with a clockwise current flow. Accordingly, step 1407 may represent the second step in the sequence 1400, 1408 the third, and 1409 the fourth. In step 1407, the second step, base pad 415b will again be active with a counterclockwise current flow and base pad 415d will be active with a clockwise current flow. Step 1408 shows base pads 415c and 415e being active with clockwise and counterclockwise current flows, respectively, while the fourth step 1409 shows base pad 415d active, 415d having a clockwise current flow. In some embodiments, additional steps may be included in the entire sequence 1400. In other embodiments, fewer steps may be included in the sequence 1400 represented by FIG. 14. The number of steps/stages shown in FIG. 14 is intended to be an example and not intended to be limiting.

The chart 1403 on the left side of FIG. 14 comprises four rows 1411-1414, wherein each row may correspond to the steps 1406-1409 of the sequence 1400, and five columns, each column corresponding to one of the base pads 415. The information depicted in the chart corresponds to the discussion above regarding steps 1406-1409 and the combination of active base pads 415 and current flow directions. The graph indicating the current used by the base pads 415 to generate a power at the vehicle pad 406 for each depicted step 1406-1409 of sequence 1400.

The use of a DD vehicle pad in combination with overlapping base pads 415 and a non-sequential activation sequence with reversing current flow directions results in a power transfer that fluctuates a small amount (the least fluctuation of each of the graphs in FIG. 8-16). Additionally, the average current required to generate the power at the vehicle pad 406 is lower than some of the combinations of layouts and activation sequences in FIGS. 8-16, and this transfer occurs while only activating two base pads 415 at once and maintaining constant current flow directions (i.e., the current flow through each base pad 415 is always the same throughout the various sequence 1400 steps). Additionally, this transfer is accomplished using only a DD vehicle pad. Utilizing only a DD vehicle pad may be beneficial by minimizing the costs of the system, and reducing the cost of the vehicle pad 406 by not requiring the Q vehicle pad may be beneficial. However, this layout and activation sequence 1400 may result in cross coupling problems (caused by activating non-sequential base pads 415). As discussed above, activating combinations of base pads 415 that have cross coupling may create via loading and reflective inductances and may make the base pads 415 and the systems more difficult to tune.

Figure 15:
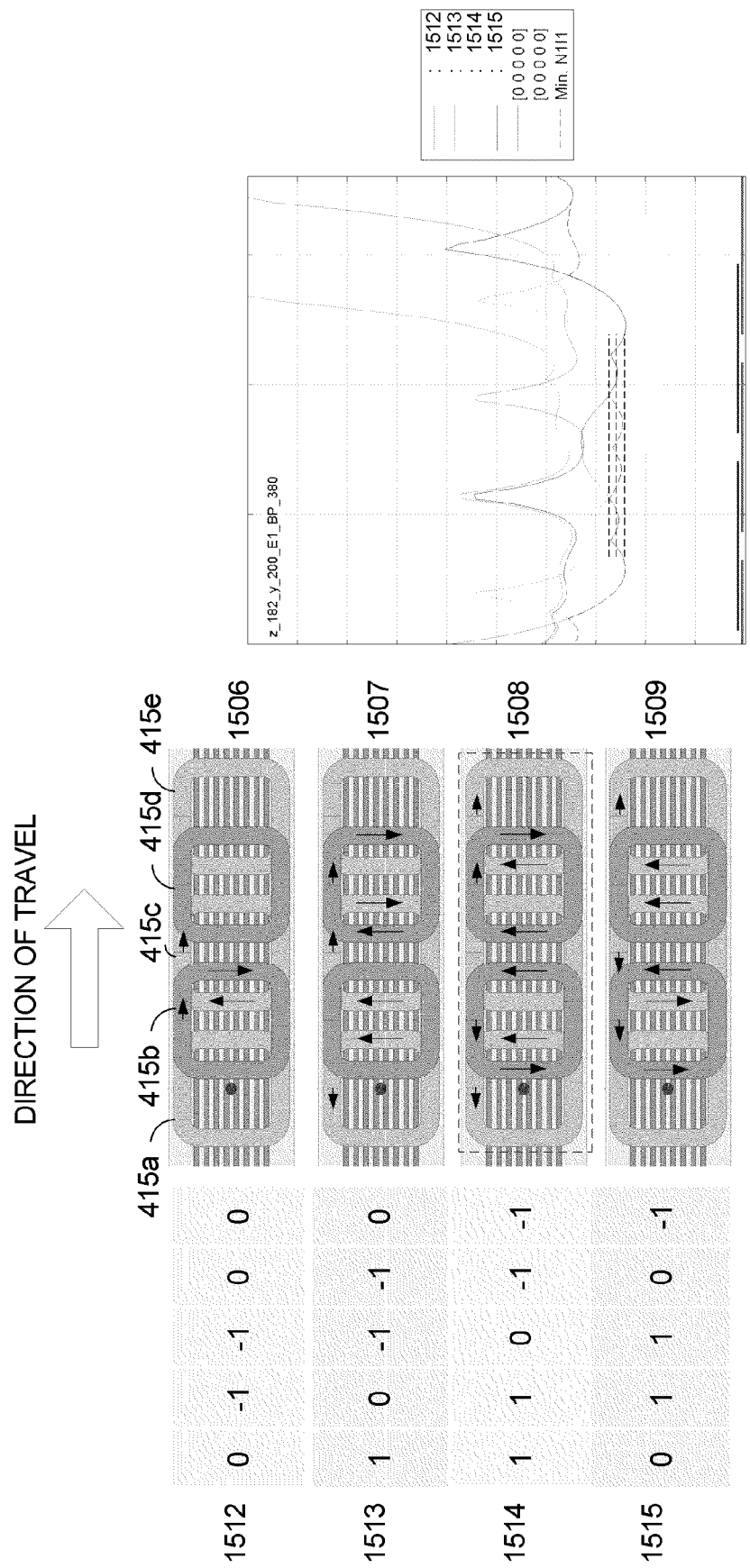
FIG. 15 illustrates an embodiment of a sequence for activating up to four overlapping base pads in a non-consecutive manner with non-reversing current flows and with a double-D-quadrature vehicle pad.

FIG. 15 illustrates an embodiment of a sequence 1500 for activating up to four overlapping base pads 415 in a non-consecutive manner (e.g., where each base pad 415 is not activated one after the other consecutively in the direction of travel) with non-reversing current flows (e.g., where the current flow direction through a base pad 415 remains constant at different times of activation, regardless of the combination of other base pads 415 with which it is activated) with a DDQ vehicle pad. While the steps 1506-1509 of sequence 1500 only show two base pads 415 active at any given moment, other embodiments may have any number of base pads 415 active at a given moment. The steps 1506-1509 comprise the overlapping base pad layout of FIG. 7a. Each of steps 1506-1509 comprise five base pads 415a-415e, arranged sequentially in the direction of travel. Each of the steps 1506-1509 represents a single stage or step in the activation sequence and indicates what combination of base pads 415 may be active at that step and in what direction the current may flow through each of the active base pads 415. For example, step 1506 may represent the first step in the sequence 1500 depicted by FIG. 15. During this step 1506, base pad 415b may be active with a clockwise current flow and base pad 415c may be active with a clockwise current flow. Accordingly, step 1507 may represent the second step in the sequence 1500, 1508 the third, and 1509 the fourth. In step 1507, the second step, base pad 415a will be active with a counterclockwise current flow, base pad 415c will be active with a clockwise current flow, and base pad 415d will be active with a clockwise current flow. Step 1508 shows base pads 415a, 415b, 415d, and 415e being active with counterclockwise, counterclockwise, clockwise and clockwise current flows, respectively, while the fourth step 1509 shows base pads 415b, 415c, and 415e active, 415b having a counterclockwise current flow, 415c having a counterclockwise current flow, and 415e having a clockwise current flow. In some embodiments, additional steps may be included in the entire sequence 1500. In other embodiments, fewer steps may be included in the sequence 1500 represented by FIG. 15. The number of steps/stages shown in FIG. 15 is intended to be an example and not intended to be limiting.

The chart 1503 on the left side of FIG. 15 comprises four rows 1511-1514, wherein each row may correspond to the steps 1506-1509 of the sequence 1500, and five columns, each column corresponding to one of the base pads 415. The information depicted in the chart corresponds to the discussion above regarding steps 1506-1509 and the combination of active base pads 415 and current flow directions. The graph indicating the current used by the base pads 415 to generate a power at the vehicle pad 406 for each depicted step 1506-1509 of sequence 1500.

The use of a DDQ vehicle pad in combination with overlapping base pads 415 and a non-sequential activation sequence of four base pads 415 without reversing current flow directions results in a power transfer that fluctuates a small amount (the least fluctuation of each of the graphs in FIG. 8-16). Additionally, the average current required to generate the power at the vehicle pad 406 the lowest of all of the combinations of layouts and activation sequences in FIGS. 8-16, thought this transfer occurs while activating four base pads 415 at once and maintaining constant current flow directions (i.e., the current flow through each base pad 415 is always the same throughout the various sequence 1500 steps). However, this efficient and smooth of a transfer is accomplished using a DDQ vehicle pad, and utilizing a DDQ vehicle pad may increase the costs of the system by requiring two types of vehicle pads 406. Additionally, this layout and activation sequence 1500 may result in cross coupling problems (caused by activating non-sequential base pads 415). As discussed above, activating combinations of base pads 415 that have cross coupling may create via loading and reflective inductances and may make the base pads 415 and the systems more difficult to tune.

Figure 16:
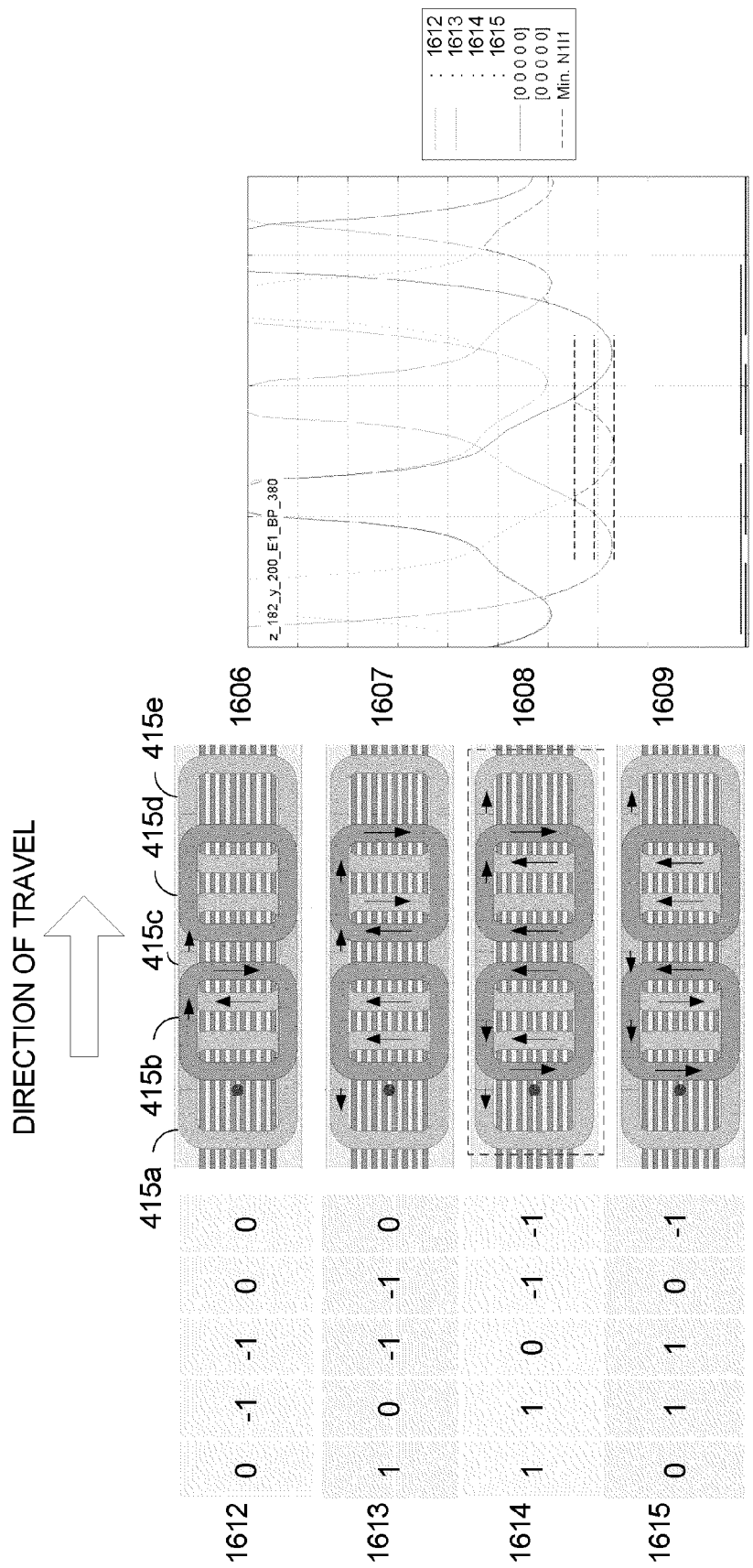
FIG. 16 illustrates an embodiment of a sequence for activating up to four overlapping base pads 415 in a non-consecutive manner with reversing current flows and with a double-D vehicle pad.

FIG. 16 illustrates an embodiment of a sequence 1600 for activating up to four overlapping base pads 415 in a non-consecutive manner (e.g., where each base pad 415 is not activated one after the other consecutively in the direction of travel) with reversing current flows (e.g., where the current flow direction through a base pad 415 may be reversed at different times of activation, dependent upon the combination of other base pads 415 with which it is activated) with a DD vehicle pad. While the steps 1606-1609 of sequence 1600 only show two base pads 415 active at any given moment, other embodiments may have any number of base pads 415 active at a given moment. The steps 1606-1609 comprise the overlapping base pad layout of FIG. 7a. Each of steps 1606-1609 comprise five base pads 415a-415e, arranged sequentially in the direction of travel. Each of the steps 1606-1609 represents a single stage or step in the activation sequence and indicates what combination of base pads 415 may be active at that step and in what direction the current may flow through each of the active base pads 415. For example, step 1606 may represent the first step in the sequence 1600 depicted by FIG. 16. During this step 1606, base pad 415b may be active with a clockwise current flow and base pad 415c may be active with a clockwise current flow. Accordingly, step 1607 may represent the second step in the sequence 1600, 1608 the third, and 1609 the fourth. In step 1607, the second step, base pad 415a will be active with a counterclockwise current flow, base pad 415c will be active with a clockwise current flow, and base pad 415d will be active with a clockwise current flow. Step 1608 shows base pads 415a, 415b, 415d, and 415e being active with counterclockwise, counterclockwise, clockwise and clockwise current flows, respectively, while the fourth step 1609 shows base pads 415b, 415c, and 415e active, 415b having a counterclockwise current flow, 415c having a counterclockwise current flow, and 415e having a clockwise current flow. In some embodiments, additional steps may be included in the entire sequence 1600. In other embodiments, fewer steps may be included in the sequence 1600 represented by FIG. 16. The number of steps/stages shown in FIG. 16 is intended to be an example and not intended to be limiting.

The chart 1603 on the left side of FIG. 16 comprises four rows 1611-1614, wherein each row may correspond to the steps 1606-1609 of the sequence 1600, and five columns, each column corresponding to one of the base pads 415. The information depicted in the chart corresponds to the discussion above regarding steps 1606-1609 and the combination of active base pads 415 and current flow directions. The graph indicating the current used by the base pads 415 to generate a power at the vehicle pad 406 for each depicted step 1606-1609 of sequence 1600.

The use of a DD vehicle pad in combination with overlapping base pads 415 and a non-sequential activation sequence of four base pads 415 with reversing current flow directions results in a power transfer that fluctuates less than many of the graphs in FIG. 8-16. Additionally, the average current required to generate the power at the vehicle pad 406 is lower than many of the combinations of layouts and activation sequences in FIGS. 8-16, though this transfer occurs while activating four base pads 415 at once and changing current flow directions (i.e., the current flow direction through each base pad 415 depends on the step of the sequence 1600). However, this transfer is accomplished using a DD vehicle pad. Utilizing only a DD vehicle pad may be beneficial by minimizing the costs of the system, and reducing a vehicle pad by not requiring the Q vehicle pad may be beneficial. Additionally, this layout and activation sequence 1600 may result in cross coupling problems (caused by activating non-sequential base pads 415). As discussed above, activating combinations of base pads 415 that have cross coupling may create via loading and reflective inductances and may make the base pads 415 and the systems more difficult to tune.

Figure 17:
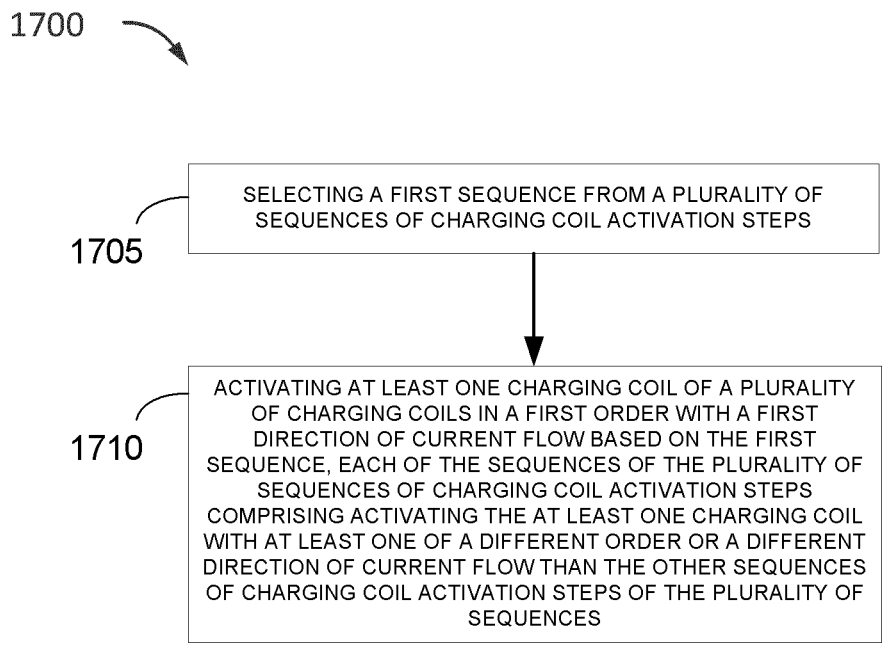
FIG. 17 illustrates a flowchart illustrating one method of charging an electric vehicle using base pads.

FIG. 17 illustrates a flowchart illustrating one method of charging an electric vehicle using base pads.

Block 1705 of method 1700 selects a first sequence from a plurality of sequences of charging coil activation steps. The charging coil activation steps may pertain to the steps or order of activating the sequence of base pads 415 as described above in relation to FIGS. 8-16. The sequences may pertain to the sequence for activating base pad 415 layouts, wherein the sequences comprise individual steps of base pad 415 activation. The first sequence may be selected by the local controller 425 or the distributed controller 445 or the electric vehicle 405. This selection may be made based on the type of vehicle pad 406, the direction and/or speed of the electric vehicle 405, or the charging requirements of the electric vehicle 405. In some embodiments, the direction, the magnitude, and/or the phase of the current flow may be controlled by the switch 420, the local controller 425, the distribution circuit 421, or the base pad 415 itself.

At block 1710 of method 1700, at least one base pad 415 (charging coil) of a plurality of base pads 415 is activated in a first order with a first direction of current flow based on the first sequence, wherein each of the sequences of the plurality of sequences of charging coil activation steps comprises activating the at least one charging coil with at least one of a different order or a different direction of current flow than the other sequences of charging coil activation steps of the plurality of sequences. Activating the at least one base pad 415 may comprise providing power to the at least one base pad 415. The power may be provided by the local controller 425 via the respective switch 420 and distribution circuit 421. The power may be sourced from the backbone 430 or the local controller 425 may generate it itself.

The method 1700 may repeat steps 1705-1710 throughout the length of the dynamic wireless charging system 400. However, if the steps are repeated for the entire length, the selecting, determining, and providing steps may be performed by the distribution controller 445 (selecting and determining) or the local controllers 425 for each base pad 415 that may be activated.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. The described functionality may be implemented in varying ways for each particular application, but such implementation decisions should not be interpreted as causing a departure from the scope of the embodiments of the invention.

The various illustrative blocks, modules, and circuits described in connection with the embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm and functions described in connection with the embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art. A storage medium is coupled to the processor such that the processor can read information from, and write information to, the storage medium. In the alternative, the storage medium may be integral to the processor. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer readable media. The processor and the storage medium may reside in an ASIC. The ASIC may reside in a user terminal. In the alternative, the processor and the storage medium may reside as discrete components in a user terminal.

For purposes of summarizing the disclosure, certain aspects, advantages and novel features of the inventions have been described herein. It is to be understood that not necessarily all such advantages may be achieved in accordance with any particular embodiment of the invention.

Thus, the invention may be embodied or carried out in a manner that achieves or optimizes one advantage or group of advantages as taught herein without necessarily achieving other advantages as may be taught or suggested herein.

Various modifications of the above described embodiments will be readily apparent, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A device for charging an electric vehicle, the device comprising:
   a plurality of charging coils configured to charge the electric vehicle; and
   at least one control circuit configured to provide power to each of the plurality of charging coils according to a selected first sequence or a selected second sequence, the first sequence configured to activate each of the plurality of charging coils in a direction of travel of the electric vehicle in a first order and with a first direction of current flow, and the second sequence configured to activate each of the plurality of charging coils in the direction of travel of the electric vehicle with at least one of a second order different from the first order or a second direction of current flow different from the first direction of current flow of the first sequence.

2. The device of claim 1, wherein the first sequence is configured to concurrently activate pairs of charging coils in a nonconsecutive order.

3. The device of claim 1, wherein the first sequence is configured to concurrently activate consecutive pairs of charging coils in a consecutive order and wherein a current flow direction of the charging coils varies between charging coils of the activated pair of charging coils.

4. The device of claim 1, wherein the first sequence is configured to concurrently activate pairs of charging coils in a nonconsecutive order and wherein a current flow direction of each of the charging coils is selectively reversible based on the first sequence.

5. The device of claim 1, wherein the first sequence is configured to activate the plurality of charging coils in a nonconsecutive order and wherein a current flow direction of each of the plurality of charging coils varies between each charging coil.

6. The device of claim 1, wherein the first sequence is configured to activate the plurality of charging coils in a consecutive order and wherein a current flow direction of each of the plurality of charging coils varies between each charging coil.

7. The device of claim 1, wherein the first sequence is configured to activate the plurality of charging coils in a nonconsecutive order and wherein a current flow direction of each of the plurality of charging coils is selectively reversible.

8. The device of claim 1, wherein the first sequence is configured to activate the plurality of charging coils in a consecutive order and wherein a current flow direction of each of the plurality of charging coils is selectively reversible.

9. The device of claim 1, wherein the selection between the first sequence and the second sequence is based on at least one of a charging requirement of the electric vehicle, a configuration of at least one vehicle pad, a type of vehicle pad, a size of the vehicle pad, a height of the vehicle pad above the charging coils, a speed of the electric vehicle, a position of the electric vehicle, a velocity of the electric vehicle, and the direction of travel of the electric vehicle.

10. The device of claim 1, wherein the plurality of charging coils and the at least one control circuit are components in a base array network (BAN) module.

11. The device of claim 1, wherein the plurality of charging coils comprises non-overlapping charging coils.

12. The device of claim 1, wherein the plurality of charging coils comprises overlapping charging coils.

13. The device of claim 1, wherein the plurality of charging coils comprises more than a pair of charging coils.

14. The device of claim 1, wherein each charging coil of the plurality of charging coils is configured to overlap with at least one other charging coil of the plurality of charging coils.

15. The device of claim 14, wherein a distance of overlap between each charging coil of the plurality of charging coils is determined by a resulting cross-coupling between overlapping charging coils.

16. The device of claim 1, wherein the direction of the current flow through each of the charging coils is controlled by at least one of the at least one control circuit and each of the plurality of charging coils.

17. The device of claim 1, further comprising a plurality of switches configured to couple each of the plurality of charging coils to the at least one control circuit.

18. A method for charging an electric vehicle, the method comprising:
   selecting a first sequence from a plurality of sequences of charging coil activation steps; and
   activating each of a plurality of charging coils in a direction of travel of the electric vehicle according to a first order and with a first direction of current flow based on the selected first sequence, each of the sequences of the plurality of sequences of charging coil activation steps comprising steps for activating each of the plurality of charging coils with at least one of a different order or a different direction of current flow than the other sequences of charging coil activations steps of the plurality of sequences.

19. The method of claim 18, wherein the first sequence comprises concurrently activating pairs of charging coils of the plurality of charging coils in a nonconsecutive order.

20. The method of claim 18, wherein the first sequence comprises concurrently activating pairs of charging coils in a consecutive order and wherein the direction of current flow of each of the plurality of charging coils varies between charging coils of the activated pair of charging coils.

21. The method of claim 18, wherein the first sequence comprises concurrently activating pairs of charging coils in a nonconsecutive order and wherein the direction of current flow of each of the plurality of charging coils is selectively reversible based on the first sequence.

22. The method of claim 18, wherein the first sequence comprises concurrently activating charging coils in a nonconsecutive order and wherein a current flow direction of each of the plurality of charging coils varies between charging coils.

23. The method of claim 18, wherein the first sequence comprises activating the charging coils in a consecutive order and wherein a current flow direction of each of the plurality of charging coils varies between charging coils.

24. The method of claim 18, wherein the first sequence comprises activating the charging coils in a nonconsecutive order and wherein a current flow direction of each of the plurality of charging coils is selectively reversible based on the first sequence.

25. The method of claim 18, wherein the first sequence comprises activating the charging coils in a consecutive order and wherein a current flow direction of each of the plurality of charging coils is selectively reversible based on the first sequence.

26. The method of claim 18, wherein activating each of the plurality of charging coils comprises activating a pair of overlapping charging coils.

27. The method of claim 18, wherein activating each of the plurality of charging coils comprises activating a pair of non-overlapping charging coils.

28. The method of claim 18, wherein activating each of the plurality of charging coils comprises concurrently activating more than a pair of charging coils.

29. The method of claim 18, further comprising selecting the first sequence from the plurality of sequences based on at least one of a charging requirement of the electric vehicle, a configuration of at least one vehicle pad, a type of vehicle pad, a size of the vehicle pad, a height of the vehicle pad above the charging coils, a speed of the electric vehicle, a position of the electric vehicle, a velocity of the electric vehicle, and the direction of travel of the electric vehicle.

30. The method of claim 18, further comprising controlling a direction of the current flow through each of the plurality of charging coils via at least one of a control unit, a switch, and the charging coil.

31. A device for charging an electric vehicle, the device comprising:
   a plurality of means for providing a charge to the electric vehicle;
   means for selecting a first sequence from a plurality of sequences of means for providing a charge activation steps; and
   at least one means for providing power to each of the plurality of means for providing a charge according to the selected first sequence of a plurality of sequences of charge providing means activation steps, the first sequence configured to activate each of the plurality of charge providing means in a direction of travel of the electric vehicle in a first order and with a first direction of current flow, each of the sequences of the plurality of sequences of charge providing means comprising activation steps configured to activate each of the plurality of charge providing means in the direction of travel of the electric vehicle with at least one of a different order or a different direction of current flow than the other sequences of charge providing means activations steps of the plurality of sequences.

32. The device of claim 31, wherein the first sequence is configured to concurrently activate pairs of overlapping charge providing means.

33. The device of claim 31, wherein the first sequence is configured to concurrently activate consecutive pairs of— charge providing means in a consecutive order and wherein the direction of current flow of the charge providing means varies between charge providing means of the activated pair of the charge providing means.

34. The device of claim 31, wherein the first sequence is configured to concurrently activate pairs of charge providing means in a nonconsecutive order and wherein a current flow direction of each of the charge providing means is selectively reversible based on the first sequence.

35. The device of claim 31, wherein the first sequence is configured to concurrently activate each of the charge providing means in a nonconsecutive order and wherein a current flow direction of each of the charge providing means varies between charge providing means.

36. The device of claim 31, wherein the first sequence is configured to activate each of the charge providing means in a consecutive order and wherein a current flow direction of each of the charge providing means varies between charge providing means.

37. The device of claim 31, wherein the first sequence is configured to activate each of the charge providing means in a nonconsecutive order and wherein a current flow direction of each of the charge providing means is selectively reversible based on the first sequence.

38. The device of claim 31, wherein the first sequence is configured to activate each of the charge providing means in a consecutive order and wherein a current flow direction of each of the charge providing means is selectively reversible based on the first sequence.

39. The device of claim 31, wherein the plurality of charge providing means comprises more than a pair of charge providing means.

40. The device of claim 31, further comprising means for coupling each of the charge providing means to the means for providing power.

41. The device of claim 31, further comprising means for selecting a first sequence from the plurality of sequences of charge providing means activation steps based on at least one of a charging requirement of the electric vehicle, a configuration of at least one vehicle pad, a type of vehicle pad, a size of the vehicle pad, a height of the vehicle pad above the charge providing means, a speed of the electric vehicle, a position of the electric vehicle, a velocity of the electric vehicle, and the direction of travel of the electric vehicle.

42. The device of claim 31, wherein each charge providing means is configured to overlap with at least one charge providing means.

* * * * *